(12) United States Patent
Nozawa

(10) Patent No.: US 7,986,355 B2
(45) Date of Patent: Jul. 26, 2011

(54) PICTURE DISPLAYING METHOD, PICTURE DISPLAYING APPARATUS, AND IMAGING APPARATUS

(75) Inventor: Kazuhiro Nozawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 461 days.

(21) Appl. No.: 11/707,581

(22) Filed: Feb. 16, 2007

(65) Prior Publication Data

US 2007/0206108 A1 Sep. 6, 2007

(30) Foreign Application Priority Data

Feb. 21, 2006 (JP) ................................. 2006-043970

(51) Int. Cl.
*H04N 5/202* (2006.01)
*H04N 5/222* (2006.01)
*H04N 5/14* (2006.01)
*G06K 9/38* (2006.01)

(52) U.S. Cl. .............. 348/254; 348/333.02; 348/333.12; 348/672; 382/172

(58) Field of Classification Search .............. 348/216.1, 348/222.1, 229.1, 230.1, 254–6, 333.02, 348/333.12, 671–2; 382/168–172; 358/519, 358/522
See application file for complete search history.

(56) References Cited

U.S. PATENT DOCUMENTS

| | | | |
|---|---|---|---|
| 6,262,817 B1 | 7/2001 | Sato et al. | |
| 7,006,688 B2 * | 2/2006 | Zaklika et al. | 382/165 |
| 7,068,328 B1 * | 6/2006 | Mino | 348/672 |
| 7,084,917 B2 * | 8/2006 | Matsushima | 348/333.02 |
| 7,161,618 B1 * | 1/2007 | Niikawa et al. | 348/207.1 |
| 7,230,644 B2 * | 6/2007 | Nakamura et al. | 348/254 |
| 7,271,838 B2 * | 9/2007 | Suekane et al. | 348/333.02 |
| 7,352,398 B2 * | 4/2008 | Sano | 348/254 |
| 7,432,917 B2 * | 10/2008 | Wilson et al. | 345/175 |
| 2002/0126147 A1 | 9/2002 | Lavendel et al. | |
| 2003/0053692 A1 * | 3/2003 | Hong et al. | 382/171 |
| 2003/0103234 A1 | 6/2003 | Takabayashi et al. | |
| 2003/0185457 A1 | 10/2003 | Campbell | |
| 2004/0001165 A1 | 1/2004 | Shiota et al. | |
| 2004/0179131 A1 * | 9/2004 | Honda et al. | 348/362 |
| 2005/0163368 A1 | 7/2005 | Hanamoto | |
| 2006/0153446 A1 * | 7/2006 | Oh et al. | 382/169 |
| 2006/0274164 A1 * | 12/2006 | Kimura et al. | 348/231.3 |
| 2008/0123952 A1 * | 5/2008 | Parkkinen et al. | 382/168 |
| 2008/0123953 A1 * | 5/2008 | Anderson et al. | 382/168 |

FOREIGN PATENT DOCUMENTS

| | | |
|---|---|---|
| CN | 1463534 | 12/2003 |
| JP | 7 38801 | 2/1995 |
| JP | 2001 28714 | 1/2001 |
| JP | 2002 33956 | 1/2002 |
| JP | 2003 244487 | 8/2003 |
| KR | 2002 0083069 | 11/2002 |

* cited by examiner

*Primary Examiner* — Sinh Tran
*Assistant Examiner* — Daniel M Pasiewicz
(74) *Attorney, Agent, or Firm* — Frommer Lawrence & Haug LLP; William S. Frommer; Paul A. Levy

(57) ABSTRACT

A picture displaying method is disclosed. In the picture displaying method, a first picture is displayed. A luminance distribution chart which represents a distribution of luminance levels of the first picture is displayed. A first luminance level and a second luminance level are selected on the luminance distribution chart. The second luminance level is higher than the first luminance level. Input and output characteristics defined by the first luminance level and the second luminance level are changed to correct a gradation of the first picture and obtain the second picture. The first picture changes to the second picture and the second picture is displayed.

19 Claims, 19 Drawing Sheets

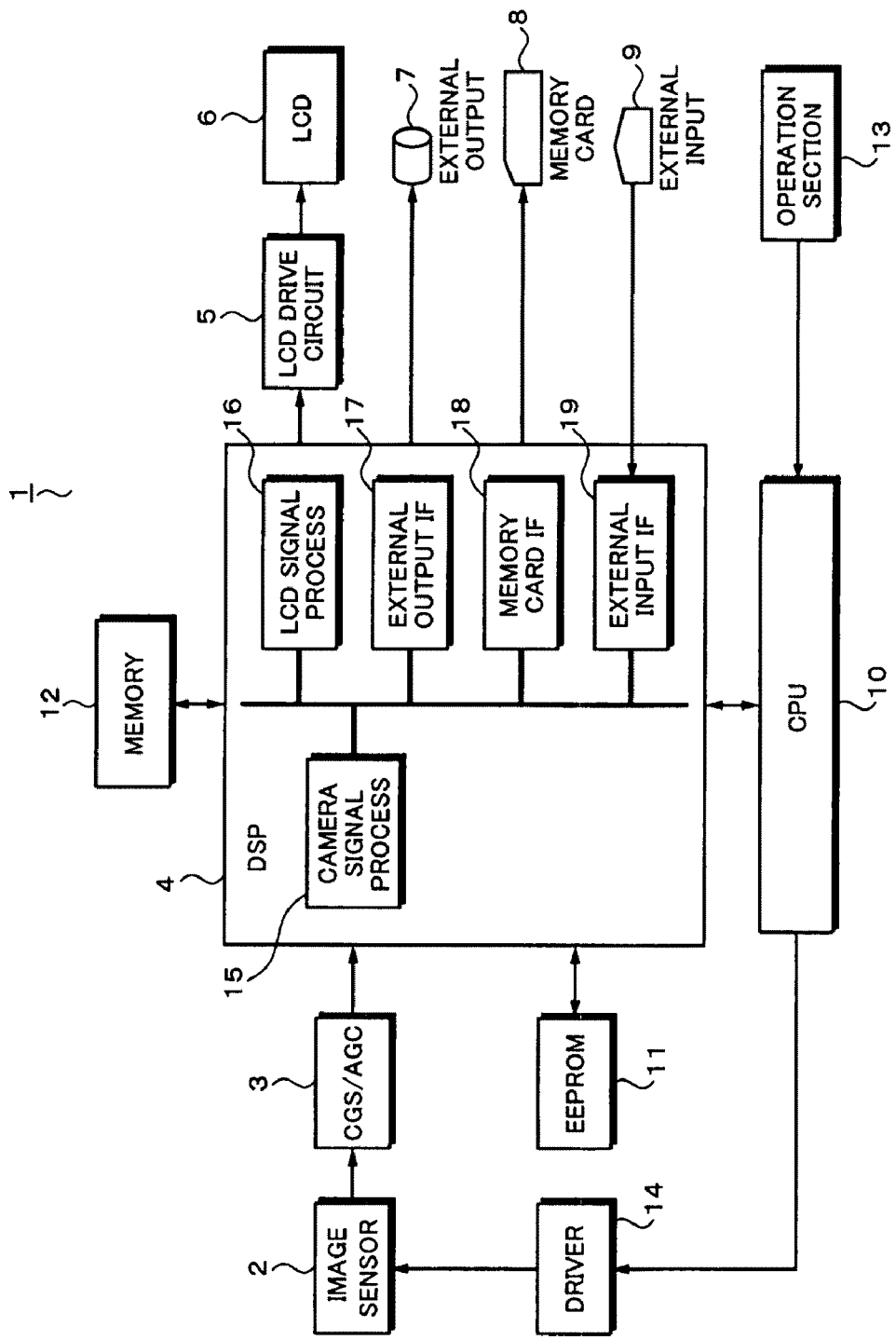

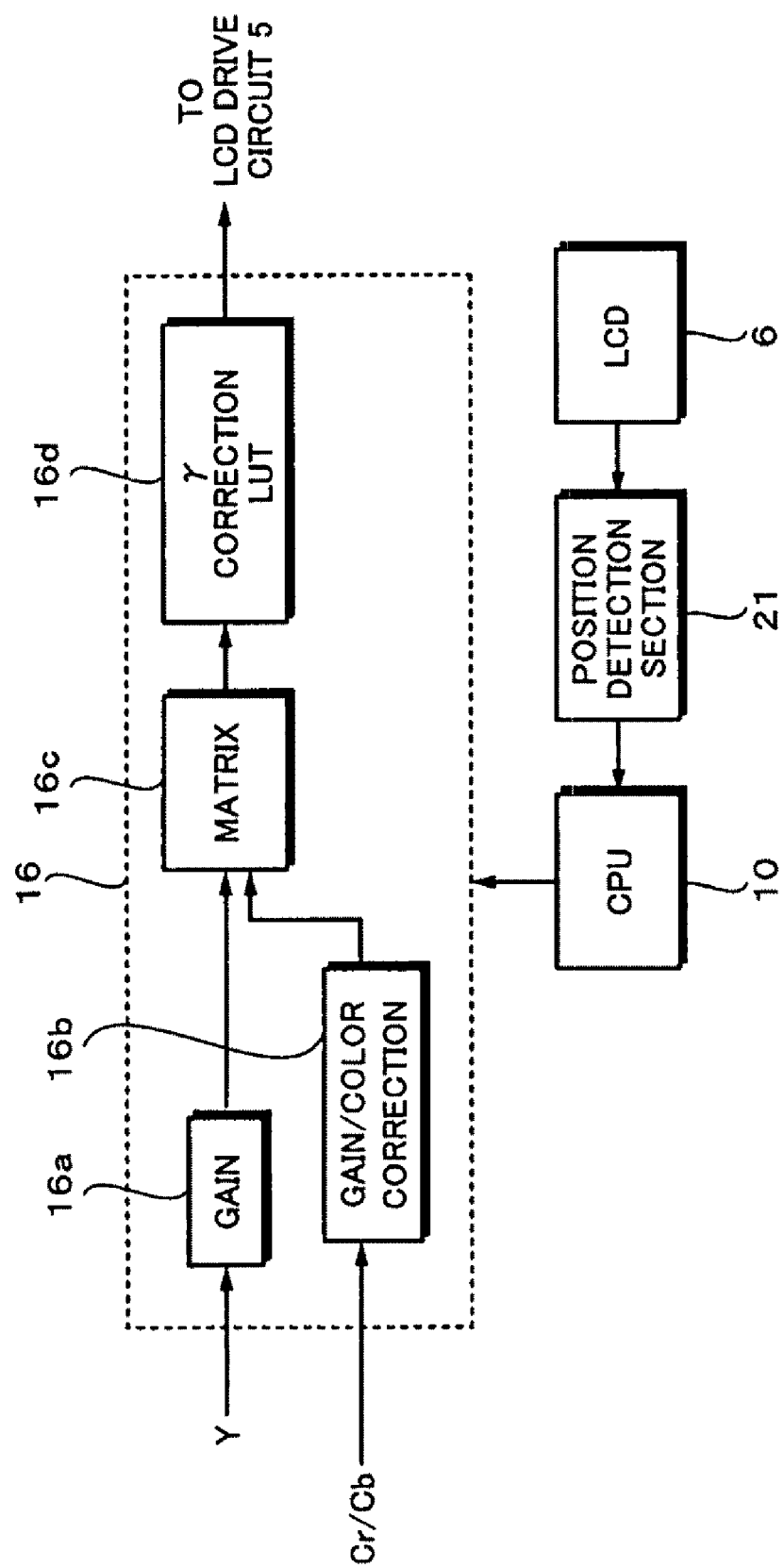

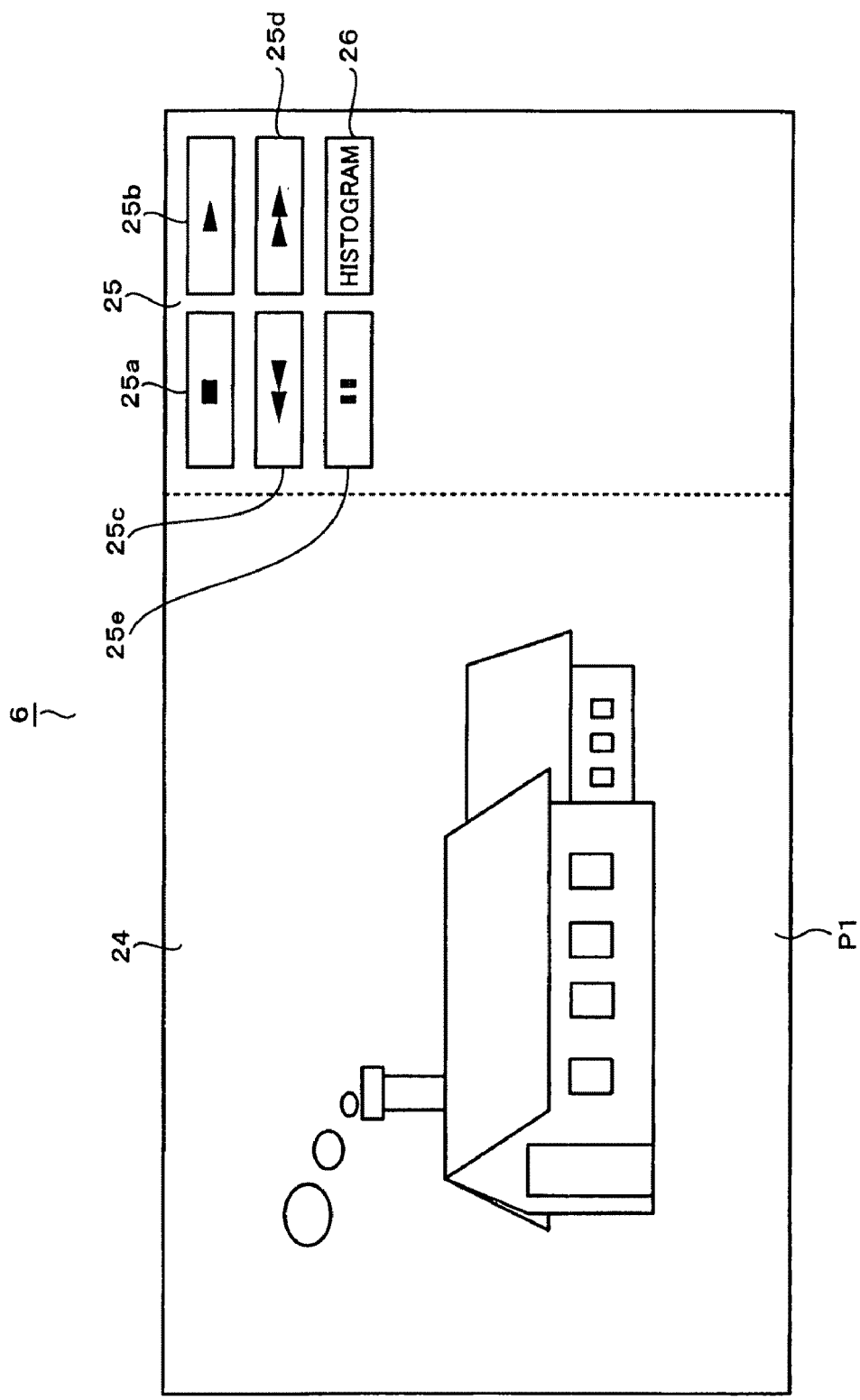

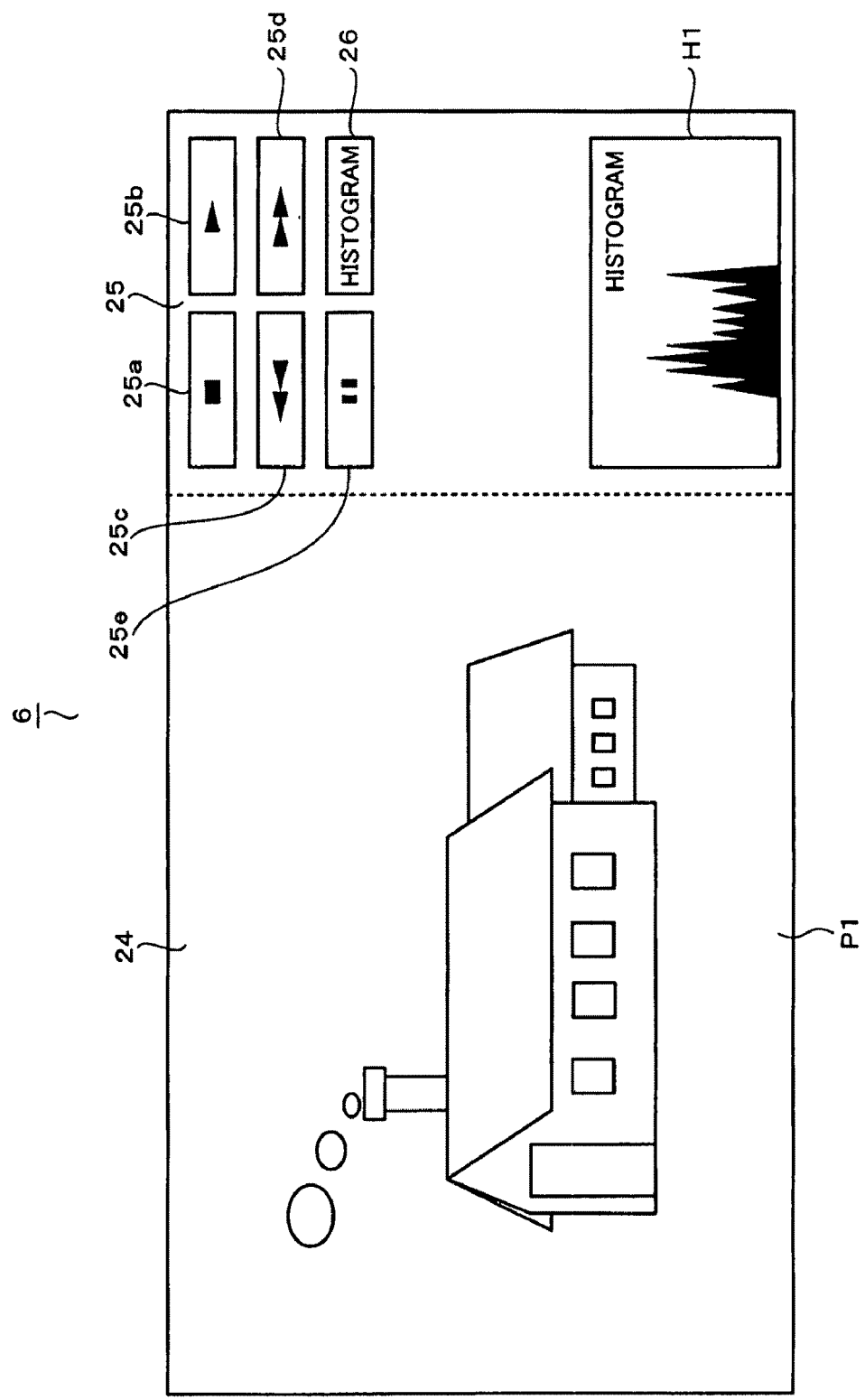

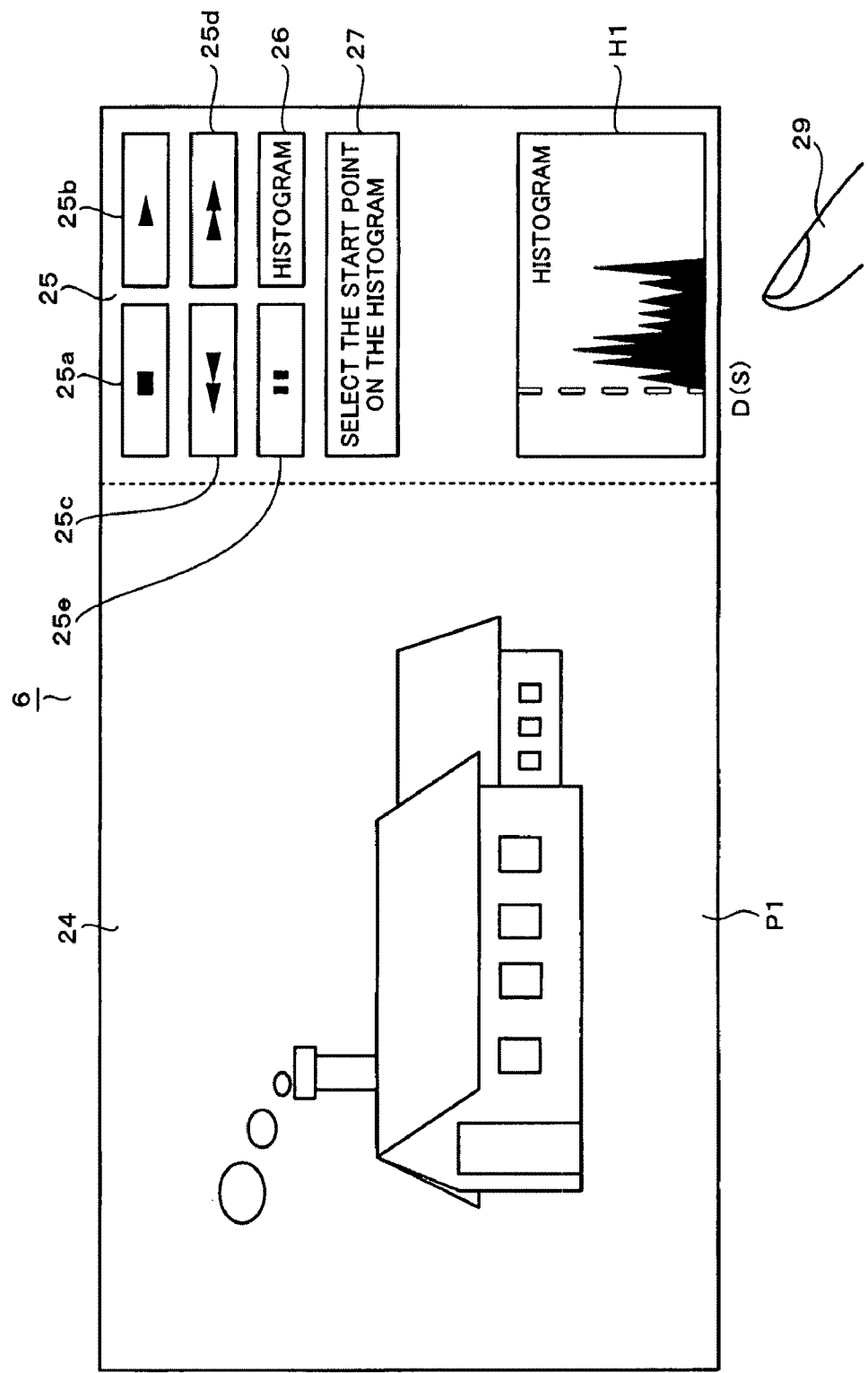

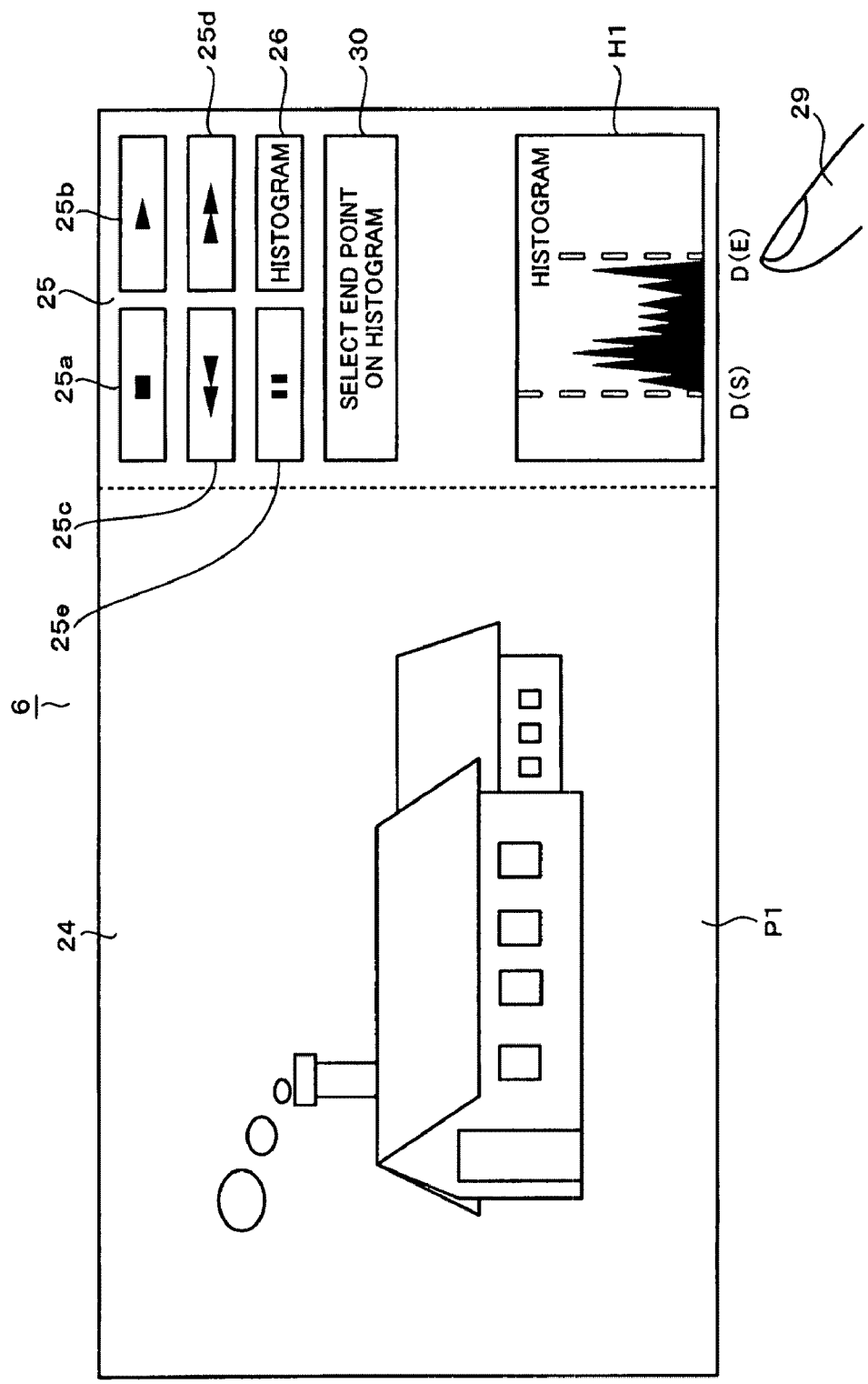

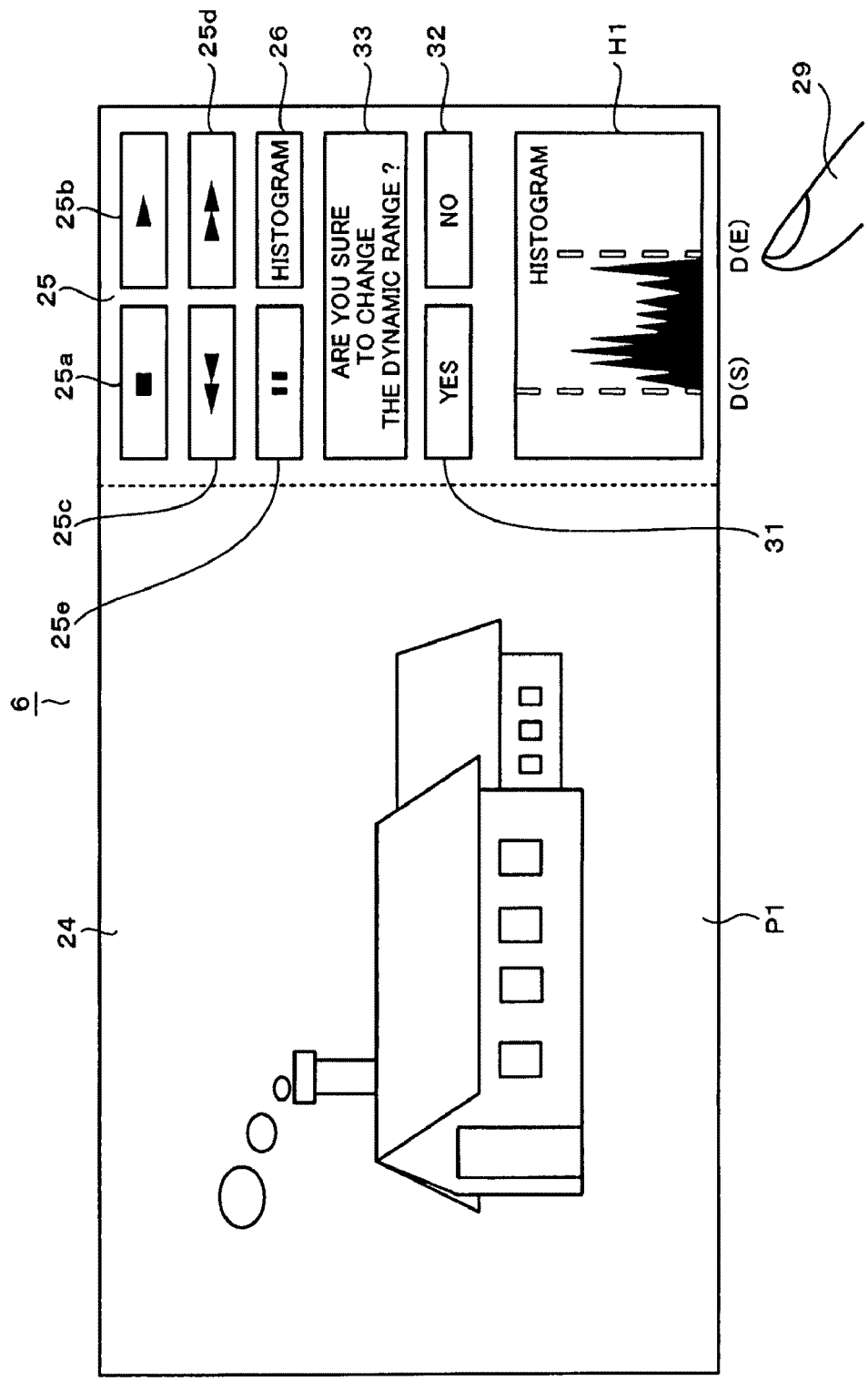

SETTING UP NEW GAMMA TABLE

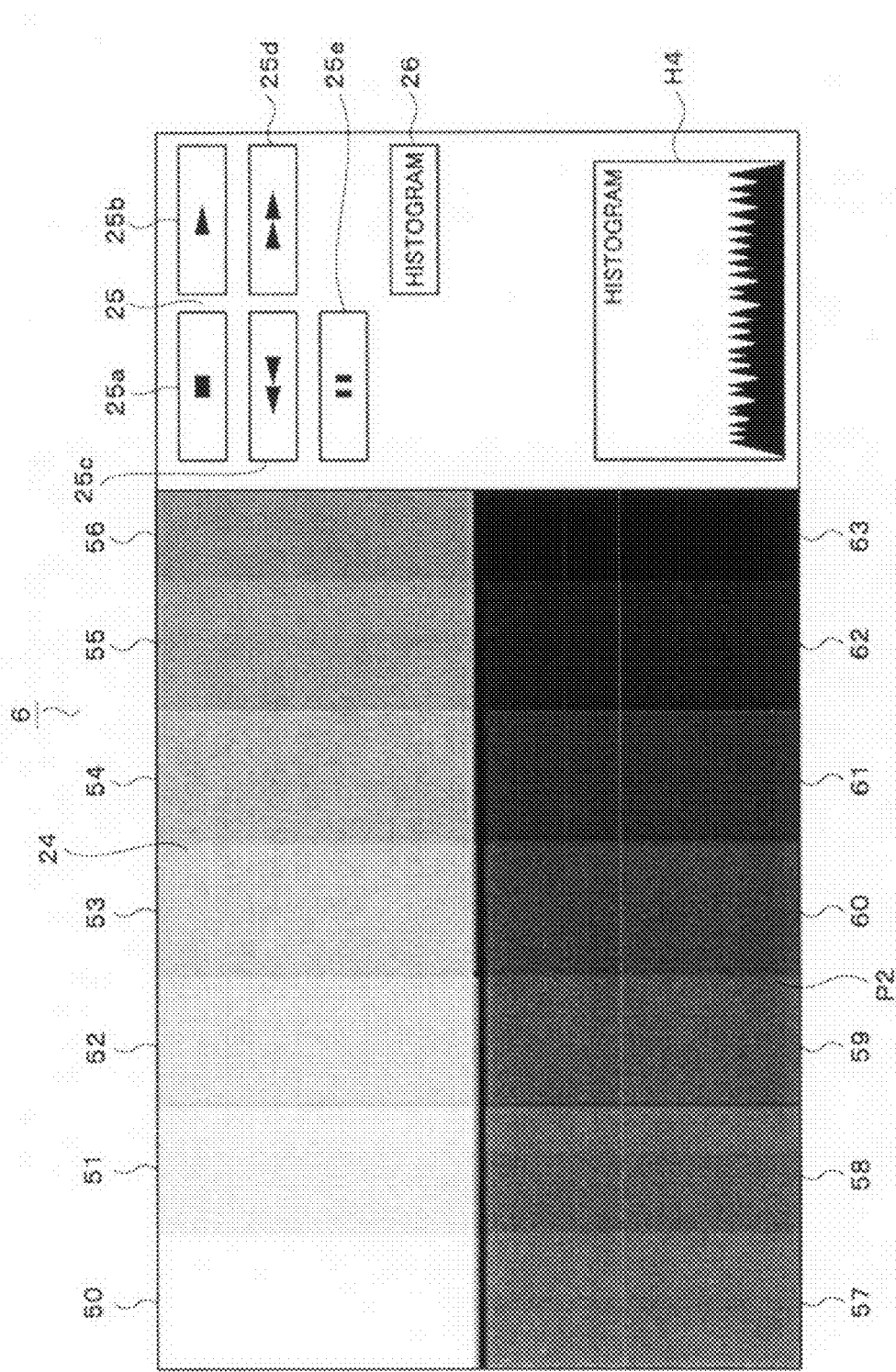

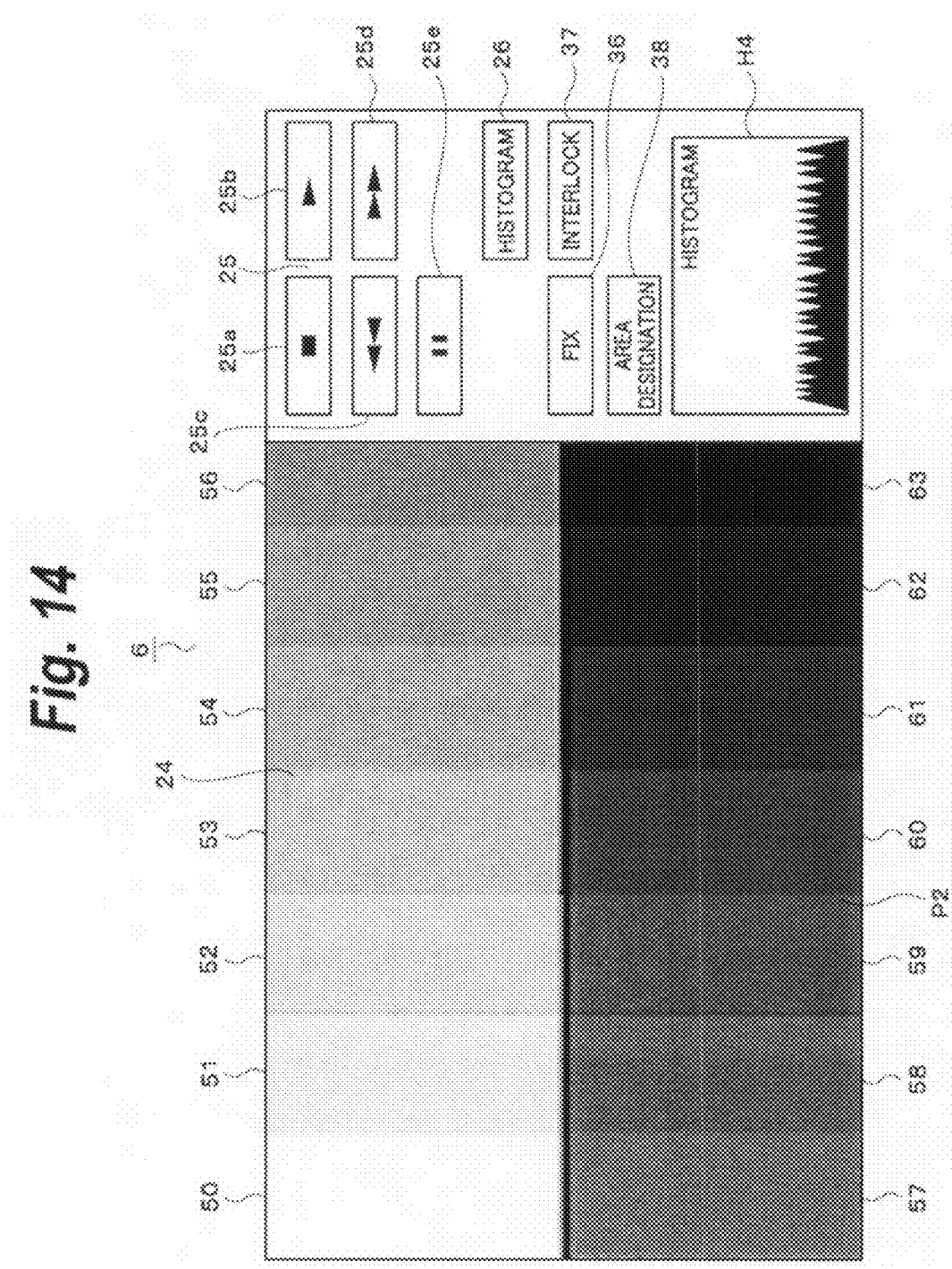

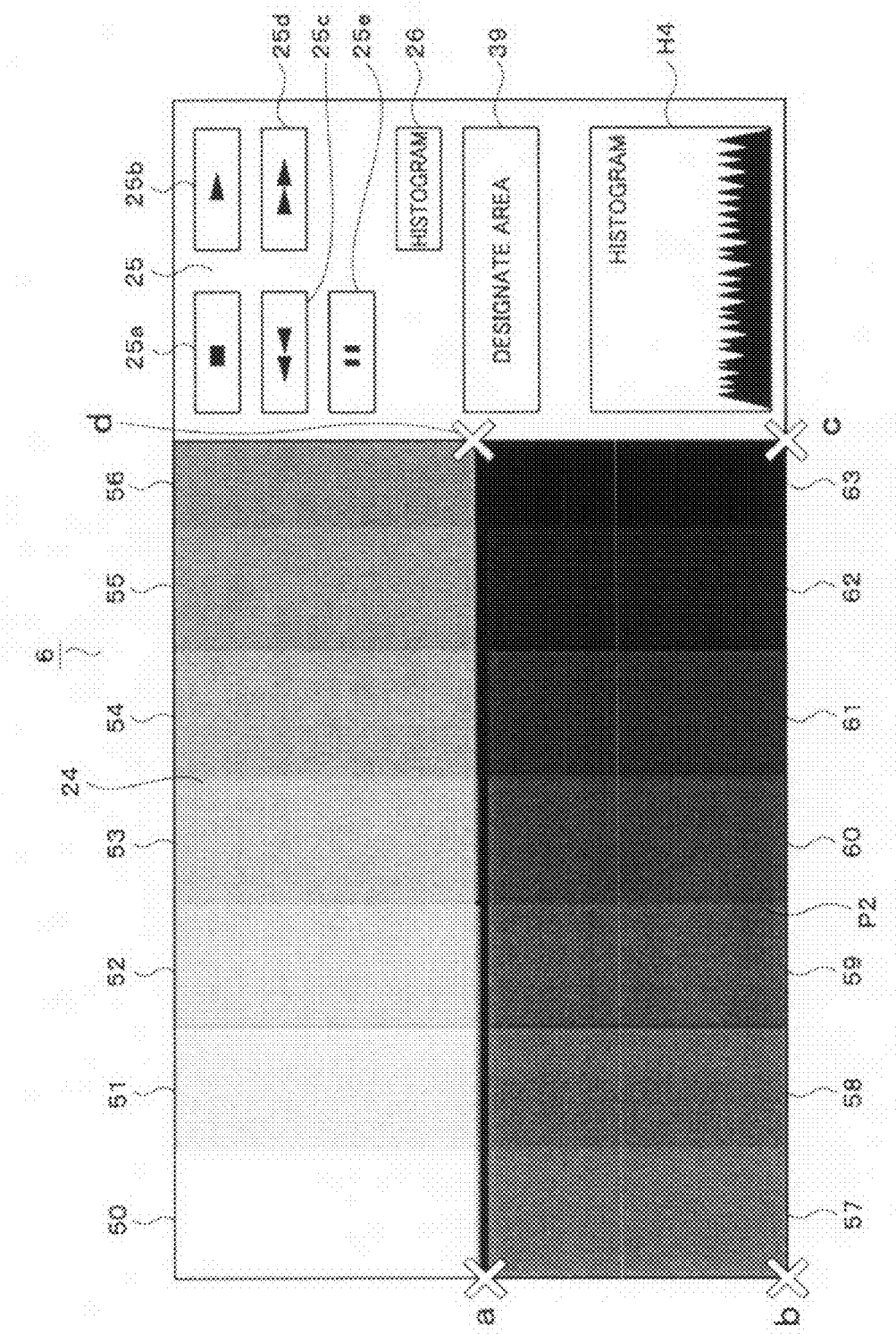

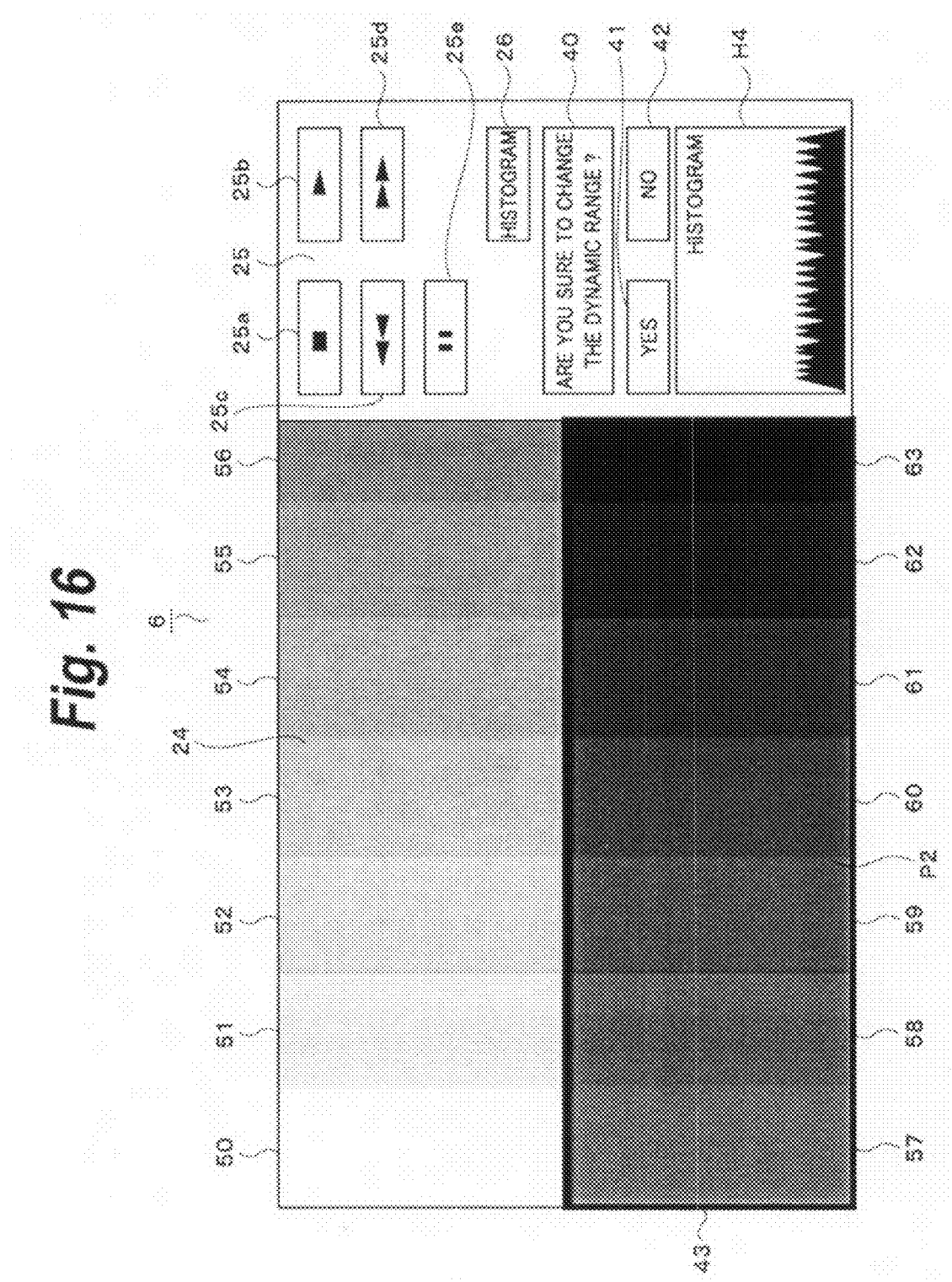

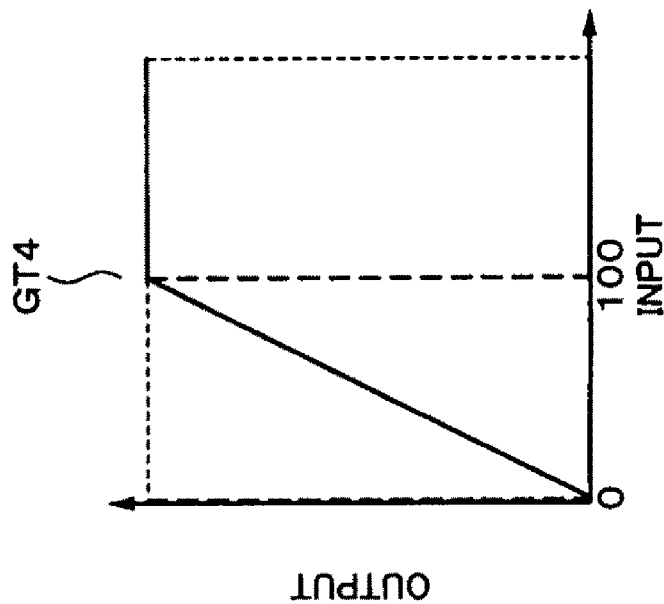
Fig. 17A
SETTING UP NEW GAMMA TABLE
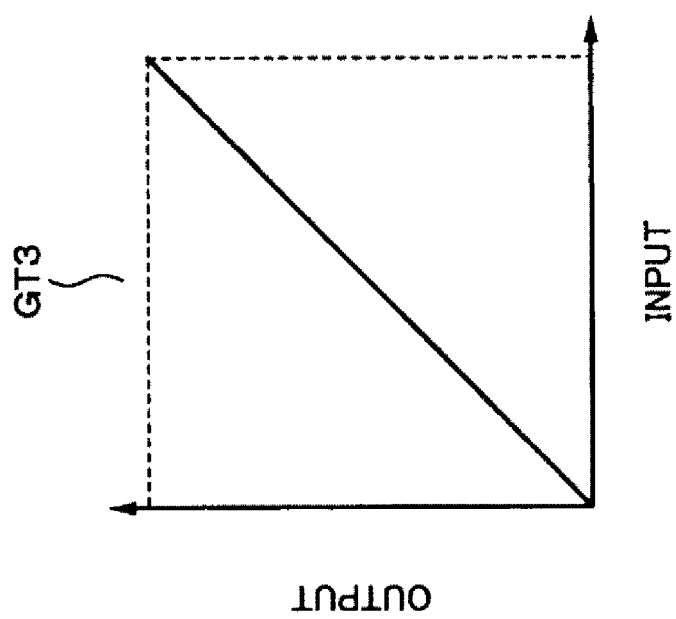
Fig. 17B

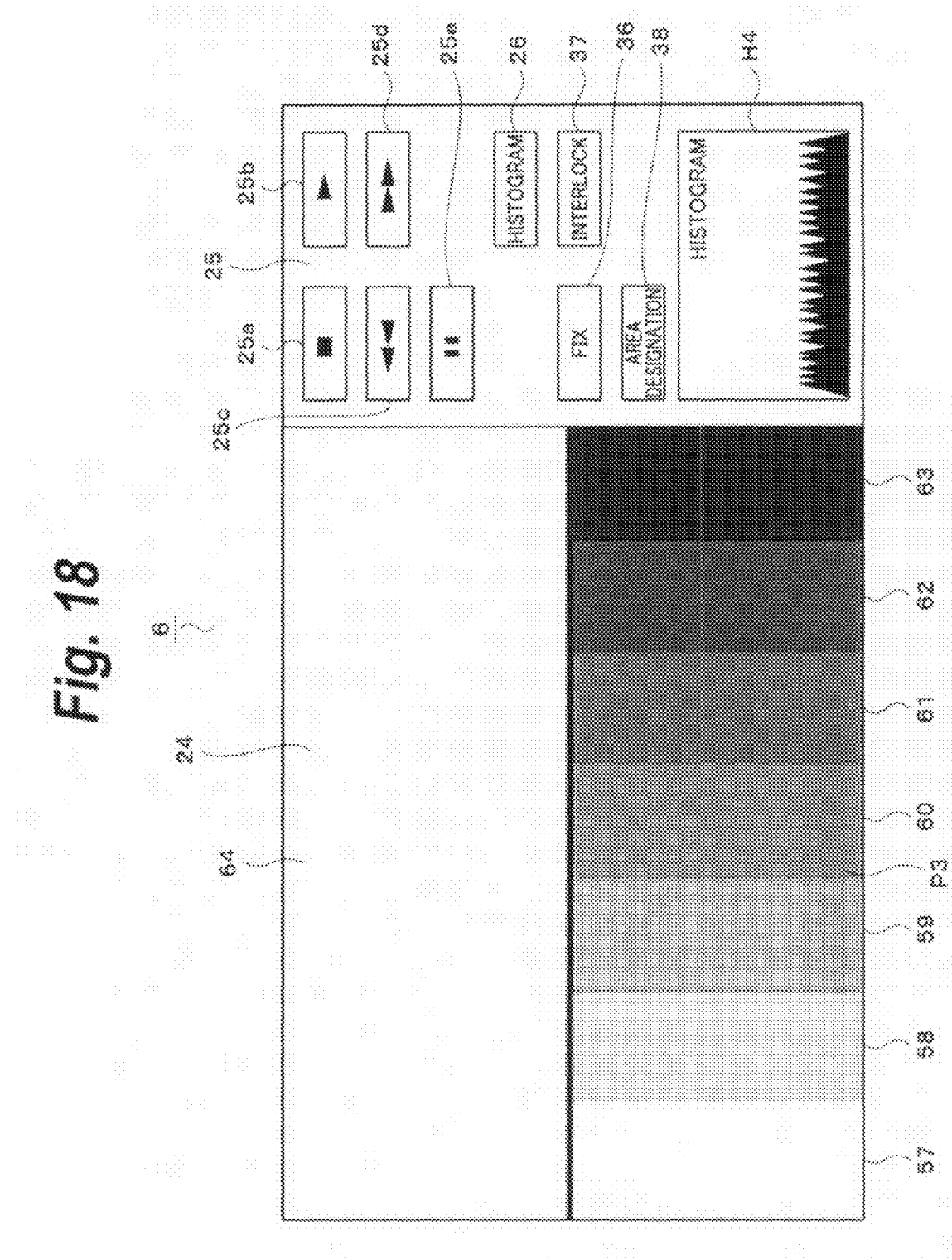

PICTURE DISPLAYING METHOD, PICTURE DISPLAYING APPARATUS, AND IMAGING APPARATUS

CROSS REFERENCES TO RELATED APPLICATIONS

The present invention contains subject matter related to Japanese Patent Application JP 2006-043970 filed in the Japanese Patent Office on Feb. 21, 2006, the entire contents of which being incorporated herein by reference.

BACKGROUND OF THE INVENTION

1. Field of the Invention

The present invention relates to a picture displaying method, a picture displaying apparatus, and an imaging apparatus.

2. Description of the Related Art

Imaging apparatuses that are common in recent years are often provided with a liquid crystal display as a display section. The user can operate the reproducing apparatus to display pictures he or she has photographed and pictures recorded on a removable medium on the LCD and browse them. In addition, the reproducing apparatus can display a histogram that represents a luminance distribution of an object that the user tries to photograph on the LCD along with pictures. With reference to the histogram displayed on the LCD, the user can properly set up exposure correction. Thus, even the user is not familiar with the operation of the imaging apparatus, he or she can photograph pictures with an enriched gradation.

In addition, the LCD is structured as a touch panel and is also used as an operation and input section. When the user presses a key that is displayed on the LCD, a process corresponding to the key can be executed.

An imaging apparatus that is capable of displaying a histogram that represents a distribution of luminance levels is described in Japanese Patent Application Laid-Open No. HEI 7-38801 (hereinafter referred to as patent document 1).

On the other hand, an imaging apparatus that has a gamma circuit that allows standard mode and wide dynamic range mode to be selectably set up and gradation conversion characteristics to be changed corresponding to these modes is described in Japanese Patent Application Laid-Open No. 2002-33956 hereinafter referred to as patent document 2.

SUMMARY OF THE INVENTION

When an object is photographed in a low luminance environment, since the dynamic range of the photographed picture is insufficient, the whole picture is likely to become dirk and dim. In the past, while such a picture was displayed on the LCD, the dynamic range of the picture was not able to be changed such that the picture became clear. The foregoing histogram is referenced to properly set up exposure correction and so forth, not to change the dynamic range of a picture displayed on the LCD. In the imaging apparatus described in patent document 2, since gradation conversion characteristics are fixed for individual modes, the gradation conversion characteristics are not able to be properly changed corresponding to user's operations.

In view of the foregoing, it would be desirable to provide a picture displaying method, a picture displaying apparatus, and an imaging apparatus that allow the dynamic range of a picture that is displayed to be easily changed with a luminance distribution chart that represents a distribution of luminance and that is displayed on a display section.

According to an embodiment of the present invention, there is provided a picture displaying method. In the picture displaying method, a first picture is displayed. A luminance distribution chart which represents a distribution of luminance levels of the first picture is displayed. A first luminance level and a second luminance level are selected on the luminance distribution chart. The second luminance level is higher than the first luminance level. Input and output characteristics defined by the first luminance level and the second luminance level are changed to correct a gradation of the first picture and obtain the second picture. The first picture is switched to the second picture and the second picture is displayed.

According to an embodiment of the present invention, there is provided a picture displaying method. In the picture displaying method, a first picture is displayed. A desired area of the first picture is set up. A minimum value and a maximum value of luminance levels of the area are determined. Input and output characteristics defined by the minimum value and the maximum value of the luminance levels are changed to correct a gradation of the first picture and obtain a second picture. The first picture is switched to the second picture and the second picture is displayed.

According to an embodiment of the present invention, there is provided a picture displaying apparatus. The picture displaying apparatus includes a display section, a luminance level determination section, a gradation correction section, and a display control section. The display section displays a first picture and a luminance distribution chart representing a distribution of luminance levels of the first picture. The luminance level determination section determines a first luminance level and a second luminance level selected on the luminance distribution chart. The second luminance level is higher than the first luminance level. The gradation correction section changes input and output characteristics defined by the first luminance level and the second luminance level to correct a gradation of the first picture and obtain a second picture. The display control section controls switching from displaying the first picture to displaying the second picture.

According to an embodiment of the present invention, there is provided a picture displaying apparatus. The picture displaying apparatus includes a display section, a luminance level determination section, a gradation correction section, and a display control section. The display section displays a first picture. The luminance level determination section determines a minimum value and a maximum value of luminance levels of an area set up for the first picture. The gradation correction section changes input and output characteristics defined by the minimum value and the maximum value of the luminance levels to correct a gradation of the first picture and obtain the second picture. The display control section controls switching from displaying the first picture to displaying the second picture on the display section.

According to an embodiment of the present invention, there is provided an imaging apparatus. The imaging apparatus includes an imaging section, a display section, a luminance level determination section, a gradation correction section, and a display control section. The display section displays a first picture captured by the imaging section and a luminance distribution chart representing a distribution of luminance levels of the first picture. The luminance level determination section which determines a first luminance level and a second luminance level selected on the luminance distribution chart. The second luminance level is higher than the first luminance level. The gradation correction section changes input and output characteristics defined by the first luminance level and the second luminance level to correct a gradation of the first picture and obtain a second picture. The display control section controls switching from displaying the first picture to displaying the second picture on the display section.

According to an embodiment of the present invention, an area in which a dynamic range of a picture that is displayed is changed can be easily selected on a luminance distribution chart. Gradation conversion characteristics can be changed corresponding to the selected area. In addition, a gradation correction process is performed for a picture corresponding to the changed gradation conversion characteristics. A picture whose dynamic range has been changed can be displayed on the display section.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 1 is a block diagram showing a structure of an imaging apparatus according to an embodiment of the present invention;

FIG. 2 is a block diagram showing a detailed structure of an LCD signal process section according to an embodiment of the present invention;

FIG. 3 is a schematic diagram describing an initial screen displayed on an LCD;

FIG. 4 is a schematic diagram showing the LCD on which a histogram is displayed;

FIG. 5. is a schematic diagram showing an example of a screen displayed on the LCD in a start point setup mode;

FIG. 6 is a schematic diagram showing an example of a screen displayed on the LCD in an end point setup mode;

FIG. 7 is a schematic diagram showing an example of a screen displayed on the LCD in a confirmation mode;

FIG. 13 is a schematic diagram showing another example of a picture displayed on the LCD;

FIG. 14 is a schematic diagram showing the LCD on which an area designation mode can be selected;

FIG. 15 is a schematic diagram showing the LCD in the area designation mode;

FIG. 16 is a schematic diagram showing the LCD in the confirmation mode;

FIG. 17A and FIG. 17B are graphs describing another example of a process of changing a gamma table;

FIG. 18 is a schematic diagram describing an example of which a picture whose dynamic range has been changed is displayed.

DETAILED DESCRIPTION OF THE PREFERRED EMBODIMENTS

Figure 8B:
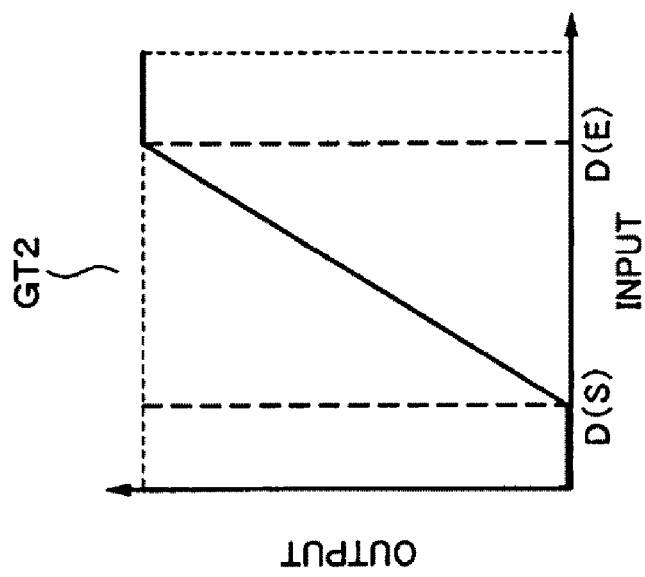
FIG. 8A and FIG. 8B are graphs describing an example of a process of changing a gamma table.

Next, with reference to the accompanying drawings, an embodiment of the present invention will be described. In this embodiment, an imaging apparatus will be described.

FIG. 1 shows the structure of the imaging apparatus according to this embodiment. The imaging apparatus is denoted by reference numeral 1. The imaging apparatus 1 includes an image sensor 2, an analog signal process section 3, a digital signal process section 4, an LCD drive circuit 5, an LCD 6, a CPU 10, an electrically erasable and programmable read only memory (EEPROM) 11, a memory 12, an operation section 13, and a driver 14. The digital signal process section 4 includes a camera signal process section 15, an LCD signal process section 16, an external output interface (I/F) 17, a memory card interface 18, and an external input interface (I/F) 19. Reference numeral 17 represents an external output terminal disposed in a housing of the imaging apparatus 1. Reference numeral 9 represents an external input terminal disposed in the housing of the imaging apparatus 1. Reference numeral 8 represents a memory card that is attachable and detachable to and from the imaging apparatus 1.

Next, each section of the imaging apparatus 1 will be described in detail. The image sensor 2 as an example of the imaging section is composed of for example a charge coupled device (CCD) or a complementary metal oxide semiconductor (CMOS). The image sensor 2 generates an electric analog signal corresponding to the amount of incident light. When necessary, an interpolation process and so forth are performed for the generated analog signal. The processed analog signal is supplied to the analog signal process section 3.

The analog signal process section 3 performs a correlated double sampling (CDS) process, an automatic gain control (AGC) process, and so forth for the supplied analog signal. The CDS process is performed for removing reset noise from the supplied analog signal. The AGC process is performed for controlling the signal level of the supplied analog signal to be constant. The processed analog signal is supplied to an analog-to-digital (A/D) conversion section (not shown). The A/D conversion section converts the analog signal into a digital signal. The digital signal is supplied to the digital signal process section 4.

The digital signal process section 4 is structured as for example a digital signal processor (DSP). The camera signal process section 15 of the digital signal process section 4 performs a white balance process and a digital signal process such as shading correction for the supplied digital signal. When necessary, the camera signal process section 15 performs an compression/decompression process for the supplied digital signal according to the Joint Photographic Coding Expert Group (JPEG) system or the like.

A digital signal outputted from the camera signal process section 15 is supplied to the LCD signal process section 16, the external output interface 17, and the memory card interface 18 depending on the process that the digital signal process section 4 executes for the digital signal.

The LCD signal process section 16 writes the digital signal supplied from the camera signal process section 15 to a frame memory (not shown). The digital signal written to the frame memory is asynchronously read therefrom, converted to a format corresponding to the LCD drive circuit 5, and supplied thereto. The LCD signal process section 16 generates a control signal with which the LCD drive circuit 5 is controlled. The generated control signal is sent to the LCD drive circuit 5. In addition, the LCD signal process section 16 of this embodiment performs gamma (γ) correction that changes input and output characteristics of a signal displayed on the LCD 6.

The LCD drive circuit 5 includes for example a data line drive circuit and a gate line drive circuit (that are not shown). The data line drive circuit and the gate line drive circuit generate a gate pulse corresponding to a control signal supplied from the LCD signal process section 16 and select a predetermined pixel. A predetermined voltage is applied to the selected pixel. As a result, a thin film transistor (TFT) of the pixel is turned on. Thus, a picture is displayed on the LCD 6.

The LCD 6, which is a part of the display section, can display pictures stored in the memory 12 disposed in the imaging apparatus 1, pictures stored in the memory card 8, and pictures inputted through the external input interface 19. In addition, the LCD 6 can display a menu screen and a histogram that represents a distribution of luminance levels of a picture displayed thereon. These pictures include moving pictures as well as still pictures. Pictures displayed on the LCD 6 are controlled to be selected by the CPU 10, which is a part of the display control section.

In this embodiment, the LCD 6 has a display characteristic of which its light transmissivity increases as the liquid crystal drive voltage applied to each pixel increases.

The LCD 6 is structured as a touch panel. When predetermined positions of the LCD 6 are pressed, various functions of the imaging apparatus 1 can be executed. As a result, the user can intuitionally operate the imaging apparatus 1. As will be described later, the LCD 6 is provided with a position detection section that detects whether or not and what position a user's finger is touching the LCD 6. Position information detected by the position detection section is supplied to the CPU 10.

The external output interface 17 has a function that interfaces with a personal computer, a printer, and so forth connected to the imaging apparatus 1. The external output interface 17 converts the digital signal supplied from the camera signal process section 15 into a digital signal having a predetermined format. The digital signal converted into the predetermined format is sent from the external output terminal 7 to an external device connected to the imaging apparatus 1.

The memory card interface 18 has a function that interfaces with a record medium such as a memory card. The memory card interface 18 converts the digital signal compressed for example by the camera signal process section 15 into a signal having a format suitable for the memory card. The converted signal is output to the memory card 8. The output signal is stored in the memory card 8. The memory card 8 is an example of the storage medium that can be attached and detached to and from the imaging apparatus 1. Instead of the memory card 8, another semiconductor memory, a magnetic record medium, an optical disc, or the like can be used.

An input signal inputted from the external input terminal 9 is supplied to the external input interface 19. The external input interface 19 converts the input signal into a signal having a predetermined format. The converted signal is supplied for example to the camera signal process section 15. The camera signal process section 15 performs a predetermined signal process for the supplied signal.

The CPU 10 includes a read only memory (ROM) and a random access memory (RAM) and controls each section of the imaging apparatus 1. For example, the CPU 10 sends a control signal to the driver 14. The driver 14 drives the image sensor 2 according to the control signal supplied from the CPU 10. The CPU 10 sends a control signal to the digital signal process section 4 so that it executes a predetermined process according to the control signal. A gamma table that for example the LCD signal process section 16 uses for a gamma correction process is set up under the control of the CPU 10.

In addition, the CPU 10 detects a luminance signal supplied from the camera signal process section 15 to the LCD signal process section 16. The CPU 10 calculates a distribution of luminance levels of a predetermined region of a picture of one screen, for example one frame period on the basis of the detected luminance signal. The CPU 10 creates a histogram that represents the calculated distribution of luminance levels. In this embodiment, the gradation of a picture displayed on the LCD 6 is composed of 8 bits. Thus, luminance levels of pixels of a picture distribute in the range from 0 to 255. The CPU 10 calculates the number of pixels in each of 256 luminance levels.

The CPU 10 supplies the created histogram to the LCD signal process section 16. When necessary, the LCD signal process section 16 superimposes a picture displayed on the LCD 6 with the histogram calculated by the CPU 10. The picture superimposed with the histogram is displayed on the LCD 6 through the LCD drive circuit 5. Since the histogram is displayed on the LCD 6, the user can easily know the distribution of luminance levels of the picture displayed on the LCD 6. As will be described later, whether the histogram is superimposed on the LCD 6 depends on whether a histogram key displayed on the LCD 6 is pressed.

As will be described later, when a desired point on the histogram displayed on the LCD 6 is pressed, the CPU 10, which is an example of the luminance level determination section, determines the luminance level corresponding to the pressed position.

The EEPROM 11 connected to the digital signal process section 4 has stored data used for a process that the camera signal process section 15 executes. For example, camera process adjustment data have been stored in the EEPROM 11.

The memory 12 is composed of a memory that is built in the imaging apparatus 1 and that is a rewritable memory such as a random access memory (RAM). The memory 12 is used as a section that temporarily stores data generated in a process that the digital signal process section 4 executes and a section that stores data of a picture photographed. Of course, a dedicated hard disk drive (HDD) that stores data of pictures that have been photographed may be built in the imaging apparatus 1.

The operation section 13 is an operation section composed of buttons, dials, and so forth disposed in the housing of the imaging apparatus 1. An operation signal generated corresponding to a button press operation and the amount of rotation of a dial is supplied to the CPU 10. The CPU 10 executes a process corresponding to the supplied operation signal.

The imaging apparatus 1 can store a signal that has been outputted from the image sensor 2 and that has not been processed by the analog signal process section 3 and the digital signal process section 4, namely raw data, to the memory card 8 and the memory 12.

Another structure may be added to the imaging apparatus 1. The imaging apparatus 1 may be provided with for example a communication section. The communication section may download picture data through a network and supply the downloaded picture data to the camera signal process section 15.

Next, the structure of the LCD signal process section 16 will be described in detail. In FIG. 2, a box surrounded by dotted lines represents an example of an outlined structure of the LCD signal process section 16. The LCD signal process section 16 includes a gain adjustment section 16a, a gain/ color correction section 16*b*, a matrix section 16*c*, and a gamma correction section 16*d* that is an example a gradation correction section.

Signals separated into a luminance signal (Y signal) and a color difference signal (Cr/Cb signal) are supplied for example from the camera signal process section 15 to the LCD signal process section 16. The gain adjustment section 16*a* corrects the gain of the luminance signal supplied to the LCD signal process section 16 to adjust the signal level. The gain-corrected luminance signal is supplied to the matrix section 16*c*.

In the LCD signal process section 16, the color difference signal is supplied to the gain/color correction section 16*b*. The LCD signal process section 16 performs a gain correction for the color difference signal to adjust the signal level. In addition, the LCD signal process section 16 performs a color correction for the color difference signal to adjust the chroma and hue thereof. The gain-corrected and color-corrected color difference signal is supplied to the matrix section 16*c*.

The matrix section 16*c* performs a one-dimensional matrix calculation process of adding the luminance signal and the color difference signal with a predetermined ratio and generates a primary color signal (RGB signals) from the luminance/color difference signals. The primary color signal generated in the matrix section 16*c* is supplied to the gamma correction section 16*d*.

The gamma correction section 16*d* performs gamma correction for each of RGB signals as the primary color signal. A gamma table that is used in the gamma correction process and that represents gradation conversion characteristics has been stored in the gamma correction section 16*d*.

The gamma correction process is performed in such a manner that a digitized signal is input as an address of a lookup table of the gamma correction section 16*d* and data written as an address corresponding to the input level is read as an output signal. The gamma table used for the gamma correction process can be rewritten under the control of the CPU 10. As a result, gradation conversion characteristics can be freely changed. The gamma-corrected primary color signal is supplied from the LCD signal process section 16 to the LCD drive circuit 5.

Correction coefficients and so forth used for the foregoing gain correction process and color correction process are set up to proper values under the control of the CPU 10. When the user presses a desired point on a histogram, superimposed with a picture and displayed on the LCD 6, the pressed position (hereinafter, sometimes referred to as a touched position) is detected by a position detection section 21. A touched position is defined for example as address information of a pixel at a pressed position on the LCD 6. A touched position detected by the position detection section 21 is supplied to the CPU 10. As will be described later, the CPU 10 creates a lookup table based on information of a touched position and sets up a new gamma table. The position detection process of the position detection section 21 may be performed by the CPU 10.

Next, an example of the operation of the imaging apparatus 1 will be described. FIG. 3 is an example of a screen displayed on the LCD 6 according to this embodiment. As shown in FIG. 3, a display area of the LCD 6 is divided into a plurality of areas. In an area represented by reference numeral 24, a picture P1 that is an example of a first picture and that has been stored in the memory card 8 or the memory 12 (in this drawing, the picture P1 is shown as a picture of a house) has been read and displayed. Hereinafter, this area is sometimes referred to as the picture display area 24.

In an area represented by reference numeral 25, keys used to execute individual functions are displayed. Hereinafter, this area is sometimes referred to the operation area 25. In this embodiment, a stop key 25*a*, a reproduction key 25*b* used to reproduce and display a picture, selection keys 25*c* and 25*d* used to select and display pictures, a pause key 25*e*, and a histogram key 26 are displayed in the operation area 25. Hereinafter, the screen shown in FIG. 3 is sometimes referred to as the initial screen.

When the histogram key 26 is pressed, the corresponding information is supplied to the CPU 10 through the position detection section 21. When the histogram key 26 has been pressed, the CPU 10 recognizes that a dynamic range change mode in which a dynamic range of the picture P1 that is displayed has been set up. The dynamic range generally represents the difference between a maximum value and a minimum value. The dynamic range of a picture that is displayed represents the dynamic range of a picture displayed on the LCD 6.

When the dynamic range change mode has been set up, the CPU 10 performs a process of calculating a distribution of luminance levels. For example, the CPU 10 detects a luminance signal outputted from the camera signal process section 15 and calculates a distribution of luminance levels of the picture P1. A histogram that represents the distribution of luminance levels calculated by the CPU 10 is created.

The LCD signal process section 16 superimposes data of the created histogram with the picture P1 and displays the resultant picture on the LCD 6 through the LCD drive circuit 5.

FIG. 4 shows an example of the LCD 6 that displays a histogram H1. As shown in FIG. 4, the histogram H1 that represents a distribution of luminance levels of the picture P1 is displayed in a predetermined area of the operation area 25. The horizontal axis of the histogram H1 represents luminance levels 0 to 255, whereas the vertical axis represents the numbers of pixels corresponding to the luminance levels.

According to an embodiment of the present invention, with a histogram displayed on the LCD 6, a dynamic range of a picture displayed on the image display area 24 can be easily changed. Thus, even if an object was photographed in a low illumination environment and a dirk picture was displayed in the image display area 24, with the histogram, the dynamic range of the picture can be changed. A picture whose dynamic range has been changed can be displayed on the LCD 6. In the following description, the case of which the dynamic range is increased will be described.

When the histogram H1 is displayed on the LCD 6, the screen of the LCD 6 changes to a start point setup mode screen shown in FIG. 5. In the start point setup mode, a message 27 that represents "Select the start point on the histogram." is displayed in the operation area 25. Corresponding to the message 27, by pressing a desired point on the histogram, the user sets up the start point of the area in which the dynamic range is increased. For example, by touching the vicinity of the left end of the area in which luminance levels concentrate on the histogram H1 with a user's finger 29, he or she sets up the start point.

As shown in FIG. 5, after the start point has been set up, a broken line that represents the start point is displayed on the histogram H1. At this point, the position detection section 21 detects position information (X, Y) that represents the position at which the user's finger 29 touched (where X, Y represent coordinates in the display area of the histogram H1). The detected position information is supplied to the CPU 10. The CPU 10 calculates a luminance level D (S) as a first luminance level corresponding to X of the supplied position information (X, Y). The calculated luminance level D (S) is temporarily stored in the RAM of the CPU 10.

After the start point has been set up, the screen displayed on the LCD 6 changes to an end point setup mode screen shown in FIG. 6. In the end point setup mode, a message 30 that represents "Select the end point on the histogram." is displayed in the operation area 25. Corresponding to the message 30, by pressing a desired point on the histogram H1, the user sets up the end point of the area in which the dynamic range is increased. For example, by pressing the vicinity of the right end of the area in which luminance levels concentrate on the histogram H1 with the user's finger 29, he or she sets up the end point.

After the end point has been set up, a broken line that represents the end point is displayed on the histogram H1. At this point, the position detection section 21 detects position information (X', Y') that represents the position that the user's finger 29 touched (where X' and Y' represent coordinates in the display area of the histogram H1). The detected position information is supplied to the CPU 10. The CPU 10 calculates a luminance level D (E) as a second luminance level corresponding to X' of the supplied position information (X', Y') (where D (S)<D (E)). The calculated luminance level D (E) is temporarily stored in the RAM of the CPU 10.

After the start point and the end point have been set up on the histogram H1, the screen of the LCD 6 changes to a confirmation mode screen shown in FIG. 7. On the confirmation mode screen shown in FIG. 7, a message 33 that represents "Are your sure to change the dynamic range.", which asks the user whether or not to change the dynamic range in the area that has been set on the histogram H1, is displayed. In addition, a YES key 31 and a NO key 32 corresponding to the message 33 are also displayed. At this point, when the NO key 32 is pressed, the screen of the LCD 6 changes to the start point setup mode screen shown in FIG. 5. Of course, the screen of the LCD 6 may change to another screen other than the start point setup mode screen.

When the YES key 31 is pressed on the screen shown in FIG. 7, the CPU 10 rewrites the gamma table stored in the gamma correction section 16*d* and creates a lookup table.

Figure 8A:
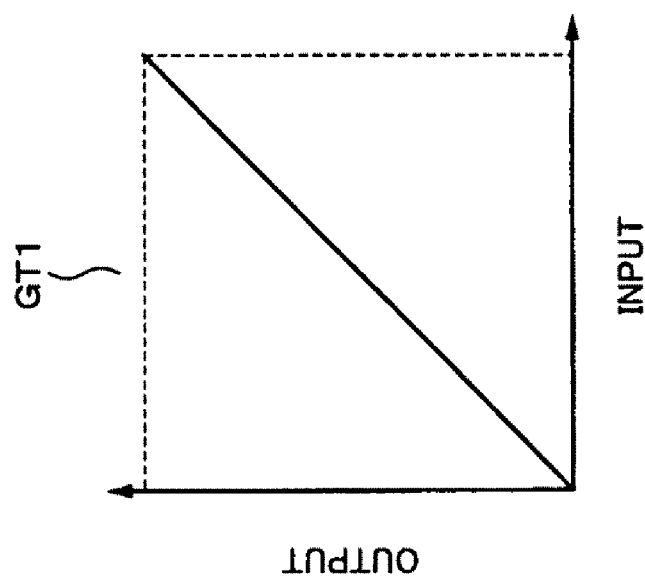

FIG. 8A and FIG. 8B show an example of a process of rewriting a gamma table. In this example, for simplicity, it is assumed that a signal that is input to the gamma correction section 16*d* has linear input/output characteristics (hereinafter, this signal is sometimes referred to as an input signal).

FIG. 8A shows a gamma table GT1 stored in the gamma correction section 16*d*. An input on the horizontal axis of the gamma table GT1 corresponds to a luminance level of a luminance signal that is input to the gamma correction section 16*d*, whereas an output of the vertical axis corresponds to a liquid crystal drive voltage that is output corresponding to a luminance level of an input luminance signal. The liquid crystal drive voltage represents the magnitude of a voltage applied to each pixel of the LCD 6.

The gamma table GT1 linearly correlates the luminance level with the magnitude of the liquid crystal drive voltage. Thus, as the luminance level increases, the magnitude of the liquid crystal drive voltage increases. As the magnitude of the liquid crystal voltage increases, the transmissivity of the LCD 6 increases and thereby the luminance of a picture displayed on the LCD 6 increases.

As described above, when the area in which the dynamic range of a picture that is displayed is increased with the histogram H1 has been designated, as shown in FIG. 8B, the gamma table GT1 is rewritten as a gamma table GT2. In the gamma table GT2, the liquid crystal drive voltage as an output linearly changes between the luminance level D (S) and the luminance level D (E). Until the luminance level becomes D (S), since the liquid crystal display voltage is 0, luminance levels equal to or lower than D (S) of pixels of the picture P1 are changed to 0. In other words, the luminance level D (S) becomes the maximum value of luminance levels that are converted into the minimum value of the dynamic range of the picture P1 that is displayed.

When the luminance level increases up to D (E), the corresponding liquid crystal drive voltage becomes the maximum. The maximum liquid crystal drive voltage is for example around 5 V although it depends on characteristics and so forth of the liquid crystal. Thus, luminance levels of pixels that exceed D (E) are changed to 255. In other words, the luminance level D (E) becomes the minimum value of luminance levels that are converted into the maximum value of the dynamic range of the picture P1 that is displayed.

Since the gamma table GT1 has been rewritten as the gamma table GT2 in such a manner, the dynamic range of the picture P1 that is displayed can be increased in the area from the designated luminance level D (S) to D (E).

The picture P1 is gamma-corrected with the rewritten gamma table GT2. The gamma correction section 16*d* outputs a predetermined liquid crystal drive voltage. The data line drive circuit and the gate line drive circuit of the LCD drive circuit 5 operate corresponding to the output liquid crystal drive voltage, causing a new picture (second picture) changed from the picture P1 to be displayed on the LCD 6. At this point, the histogram H1 may remain displayed in the operation area 25. Instead, a histogram representing a distribution of luminance of the new picture may be displayed.

In such a manner, the dynamic range of a picture that is displayed in the picture display area 24 of the LCD 6 can be easily increased by a simple operation.

Next, another example of which an area in which a dynamic range is changed is set up with a histogram will be described. When a picture displayed in the picture display area 24 of the LCD 6 changes, a histogram representing a distribution of luminance levels of the picture changes. In this example, a gamma table corresponding to a newly displayed picture (third picture) is automatically set up again with an area that has been set up.

Figure 9A:
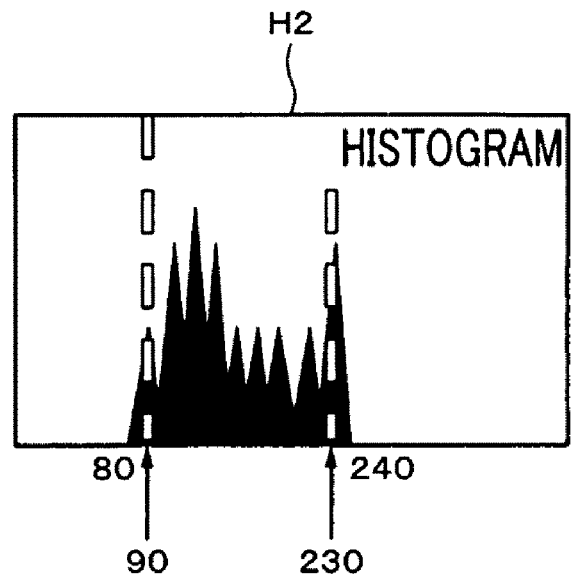
FIG. 9A and FIG. 9B are graphs describing an example of which a dynamic range is changed.

FIG. 9A shows an example of a histogram of which a start point and an end point of an area in which a dynamic range is increased have been set up with a histogram H2 representing a distribution of luminance of pixels of a particular picture (first picture). On the histogram H2, luminance levels of pixels of the picture distribute in an area from 80 to 240. It is assumed that as an example of a first luminance level corresponding to the start point of the area, luminance level 90 has been set up and as an example of a second luminance level corresponding to. the end point of the area, luminance level 230 has been set up. In addition, it is assumed that a picture displayed in the picture display area 24 is changed without gamma correction that increase a dynamic range of the area that has been set up. After a picture (second picture) that has been gamma-corrected is displayed in the picture display area 24, when the picture changes to a new picture (third picture), the same process is performed.

Figure 9B:
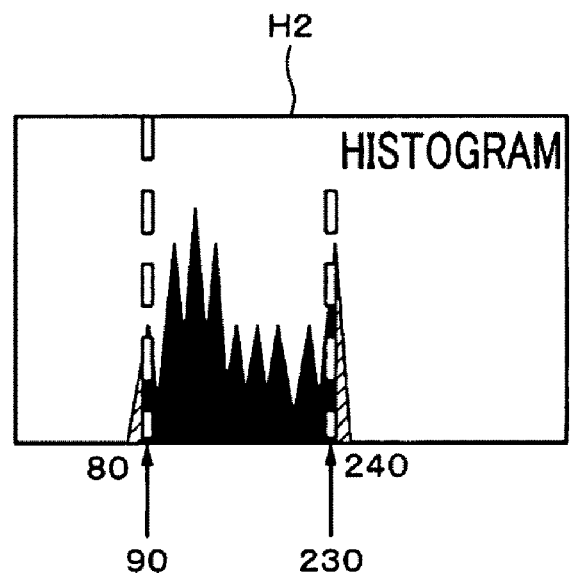

As shown in FIG. 9B, the dynamic range of the picture that is displayed is increased in the area from luminance levels 90 to 230. On the other hand, in a hatched area of luminance levels 80 to 90 and another hatched area of luminance levels 230 to 240, pixels of the picture become saturated black (the minimum black) or saturated white (the maximum white).

Figure 10A:
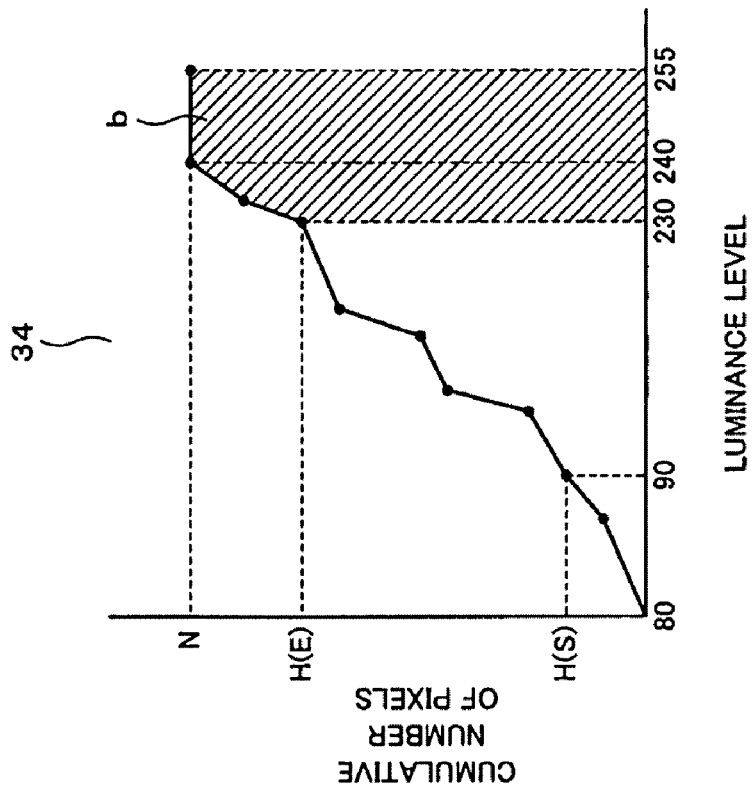
FIG. 10A and FIG. 10B are graphs showing cumulative numbers of pixels corresponding to luminance levels.
Figure 10B:
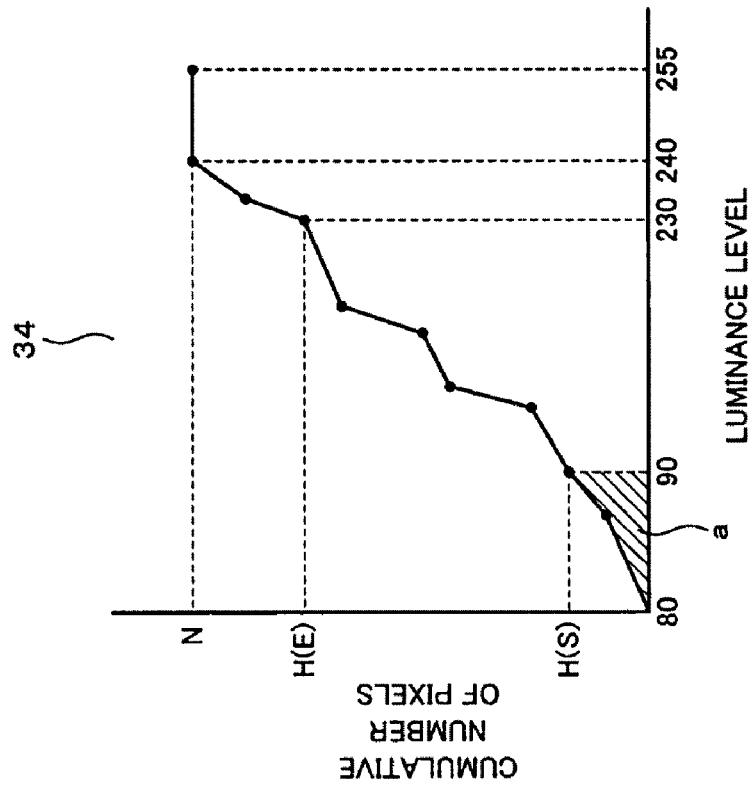

A graph 34 shown in FIG. 10A and FIG. 10B is a graph of which the numbers of pixels corresponding to individual luminance levels represented with the histogram H2 are cumulated. On the graph 34, for easy understanding, lines are simply illustrated. On the graph 34, the horizontal axis represents the luminance level, whereas the vertical axis represents the cumulative number of pixels corresponding to the luminance level. On the histogram H2, there are no pixels whose luminance levels are 80 or lower. Thus, the cumulative numbers of pixels whose luminance levels are 80 or lower are 0. In addition, there are no pixels whose luminance levels are 240 or higher. Thus, the cumulative number of pixels N whose luminance levels are 240 corresponds to the total number of pixels of the picture displayed in the picture display area 24 of the LCD 6.

The CPU 10 calculates the number of pixels that become saturated black (the minimum black) or saturated white (the maximum white). In this example, the number of pixels whose luminance levels are 90 or lower, namely become saturated black, is denoted by H (S). On the other hand, the number of pixels whose luminance levels are 230 or lower is denoted by H (E). On the graph shown in FIG. 10A, a hatched area represented by reference letter a corresponds to the number of pixels H (S) that become saturated black. On a graph shown in FIG. 10B, an area represented by reference letter b corresponds to the number of pixels (N-H (E)) that become saturated white. The calculated numbers of pixels H (S) and H (E) are temporarily stored in the RAM of the CPU 10.

Figure 11A:
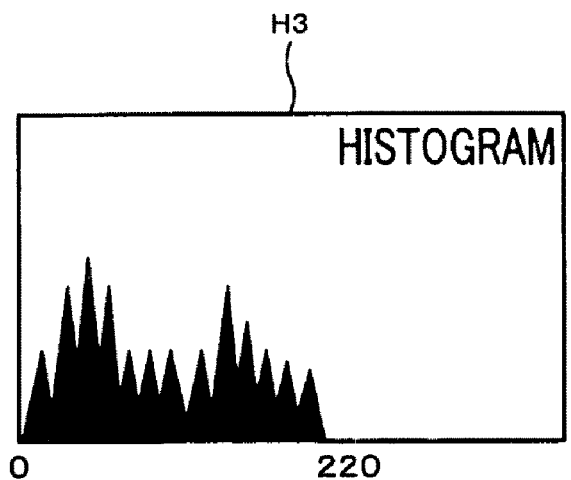
FIG. 11A and FIG. 11B are graphs describing that an area in which a dynamic range is changed is automatically set up.
Figure 11B:
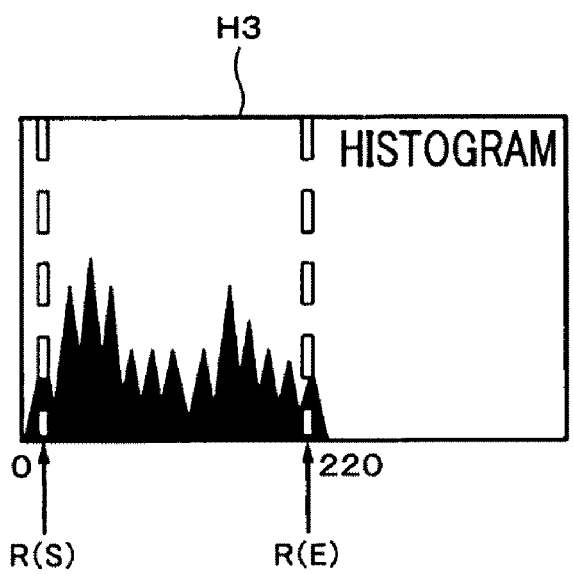

A histogram H3 shown in FIG. 11A is an example of a histogram newly displayed in the operation area 25 since a picture displayed in the picture display area 24 of the LCD 6 has been changed to a new picture (third picture). It is assumed that on the histogram H3, luminance levels of pixels distribute in an area from 0 to 220. When the histogram H3 is displayed, an area in which the dynamic range is increased is automatically set up on the histogram H3. In other words, as shown in FIG. 11B, a luminance level R (S) corresponding to a start point and a luminance level R (E) corresponding to an end point are automatically set up.

Figure 12A:
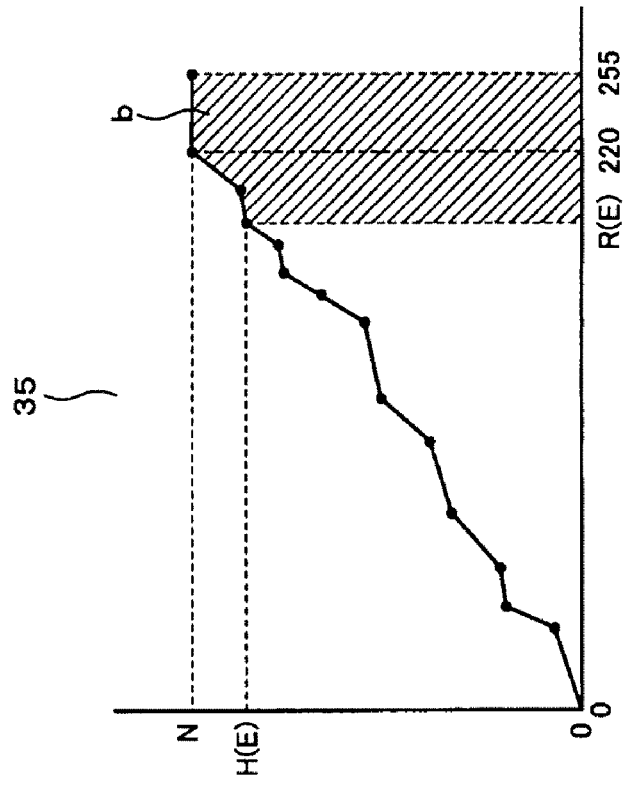
FIG. 12A and FIG. 12B are graphs describing that a start point and an end point of an area in which a dynamic range is changed are determined with cumulative numbers of pixels.
Figure 12B:
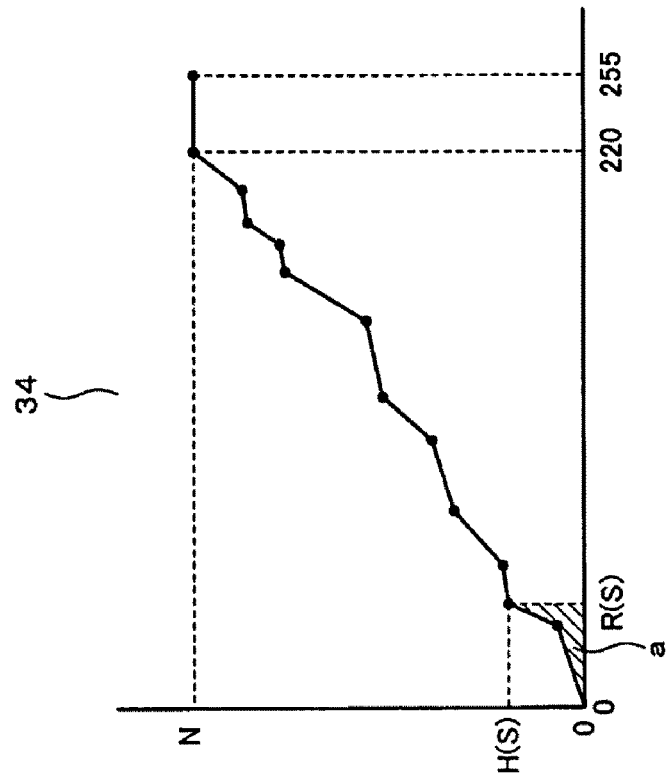

Next, an example of a method of setting up luminance levels R (S) and R (E) will be described. A graph 35 shown in FIG. 12A and FIG. 12B is a graph of which the numbers of pixels corresponding to individual luminance levels of the histogram H3 are cumulated. First of all, as shown in FIG. 12A, a luminance level corresponding to the cumulative number of pixels H (S) is determined. The determined luminance level is referred to as the luminance level R (S) and designated as the third luminance level corresponding to a start point of an area that is automatically set up on the histogram H3.

Next, as shown in FIG. 12B, a luminance level R (E) corresponding to the cumulative number of pixels H (E) is determined. For example, the cumulative number of pixels is counted from 0 to H (E). After the number of pixels is counted, the corresponding luminance level is determined. The determined luminance level is referred to as the luminance level R (E) and designated as the fourth luminance level corresponding to the end point of the area that is automatically set up on the histogram H3.

At this point, the number of pixels whose luminance levels are 90 or lower of the first picture nearly becomes the same as the number of pixels whose luminance levels are R (S) or lower of the third picture. In addition, the number of pixels whose luminance levels are 230 or higher of the first picture nearly becomes the same as the number of pixels whose luminance levels are R (E) or higher of the third picture. Thus, when a new picture is displayed on the LCD 6, while the number of pixels that become saturated black or saturated white remains unchanged, the luminance level R (S) and the luminance level R (E) can be automatically set up. Thus, when a new picture is displayed on the LCD 6, it is not necessary for the user to designate an area in which the dynamic range is changed. Of course, the user may be able to change the area in which the dynamic range has been automatically set up.

Next, an example, where an area in which a dynamic range of a picture to be displayed is changed is set up with a picture displayed in the picture display area 24, will be described. For example, it is assumed that a picture P2 whose luminance level gradually changes from 0 to 255 is displayed on the LCD 6 as shown in FIG. 13. For convenience, the picture P2 has been divided into rectangular areas 50 to 63. In addition, various types of operation keys 25a to 25e, a histogram key 26, and a histogram H4 that represents a distribution of luminance levels of the picture P2 are displayed in the operation area 25 of the LCD 6.

When the histogram key 26 is pressed in the state shown in FIG. 13, it is recognized that a dynamic range change mode takes place. As a result, the screen displayed on the LCD 6 changes to a screen shown in FIG. 14. As shown in FIG. 14, a fix key 36, an interlock key 37, and an area designation key 38 are newly displayed in the operation area 25. When the fix key 36 is pressed, a dynamic range changing area designation mode takes place. In the dynamic range change area designation mode, by touching the histogram H4, the dynamic rage changing area in which the dynamic range of the picture to be displayed is changed can be set up. When the interlock key 37 is pressed, an interlock mode takes place. In the interlock mode, the dynamic range changing area that has been set up is applied to another picture as described with the foregoing example. When the area designation key 38 is pressed, an area designation mode takes place. In the area designation mode, the screen displayed on the LCD 6 changes to a screen shown in FIG. 15.

In the area designation mode, as shown in FIG. 15, a message 39 that represents "Designate the area." is displayed in the operation area 25. Corresponding to the message 39, the user designates the dynamic range changing area in which the dynamic range of a picture to be displayed is changed. In this example, by pressing a desired point on the picture P2, the user can designate the area.

Assuming that the dynamic range of the area 57 to area 63 that are black or close to black are changed, the user presses four points represented by reference letters a to d that include the area 57 to area 63 to designate the areas. In this example, areas are designated with four points. Instead, areas may be designated with three points.

When an area has been designated, the screen displayed on the LCD 6 changes to a confirmation mode screen shown in FIG. 16. As shown in FIG. 16, a frame 43 clarifies the designated area. In addition, a message 40 that represents "Are you sure to change the dynamic range ?" is displayed in the operation area 25. A YES key 41 and a NO key 42 corresponding to the message 40 are displayed. When the NO key 42 is pressed, the screen displayed on the LCD 6 changes to for example the screen shown in FIG. 13.

When the YES key 41 is pressed, a gamma table stored in the gamma correction section 16d is rewritten and a lookup table is created therewith. A process of changing the dynamic range of the picture P2 to be displayed is performed. The dynamic range of the picture P2 to be displayed is changed for example in the following manner.

The CPU 10 calculates a minimum value and a maximum value of luminance levels in the areas surrounded by the frame 43. In this example, it is assumed that luminance level 0 and luminance level 100 have been calculated as the minimum value and the maximum value, respectively. The gamma table stored in the gamma correction section 16d is rewritten corresponding to the calculated minimum value and maximum value of the luminance levels.

FIG. 17A and FIG. 17B show an example of the process of rewriting a gamma table. For example, it is assumed that a gamma table GT3 that linearly correlates characteristics of the luminance level (input) and the liquid crystal drive voltage (output) has been stored in the LCD signal process section 16 as shown in FIG. 17A. The CPU 10 performs a process of rewriting the gamma table GT3 as a gamma table GT4 shown in FIG. 17B. In other words, the gamma table is rewritten so that the liquid crystal drive voltage linearly changes between minimum value 0 and maximum value of the luminance levels.

At this point, luminance level 0 is the maximum value of luminance levels converted into the minimum value of the dynamic range of a picture that is displayed. On the other hand, luminance level 100 is the minimum value of luminance levels converted into the maximum value of the dynamic range that is displayed. By rewriting the gamma table as the gamma table GT4, the dynamic range of a picture that is displayed in the area from luminance levels 0 to 100 can be increased.

With the gamma table GT4, a gamma correction process is performed. FIG. 18 shows a picture P3 of which the picture P2 has been gamma-corrected and that is an example of a fourth picture displayed on the LCD 6. In the picture P3, contrasts of the area 57 to area 63 that have been designated are improved and the dynamic range of a picture that is displayed is increased. On the other hand, the luminance levels of the area 50 to area 56 (represented by reference numeral 64 in FIG. 18) are 255. Thus, by pressing a desired point of a picture displayed in the picture display area 24 of the LCD 6, an area is designated and the dynamic range of the designated area can be changed.

Figure 19:
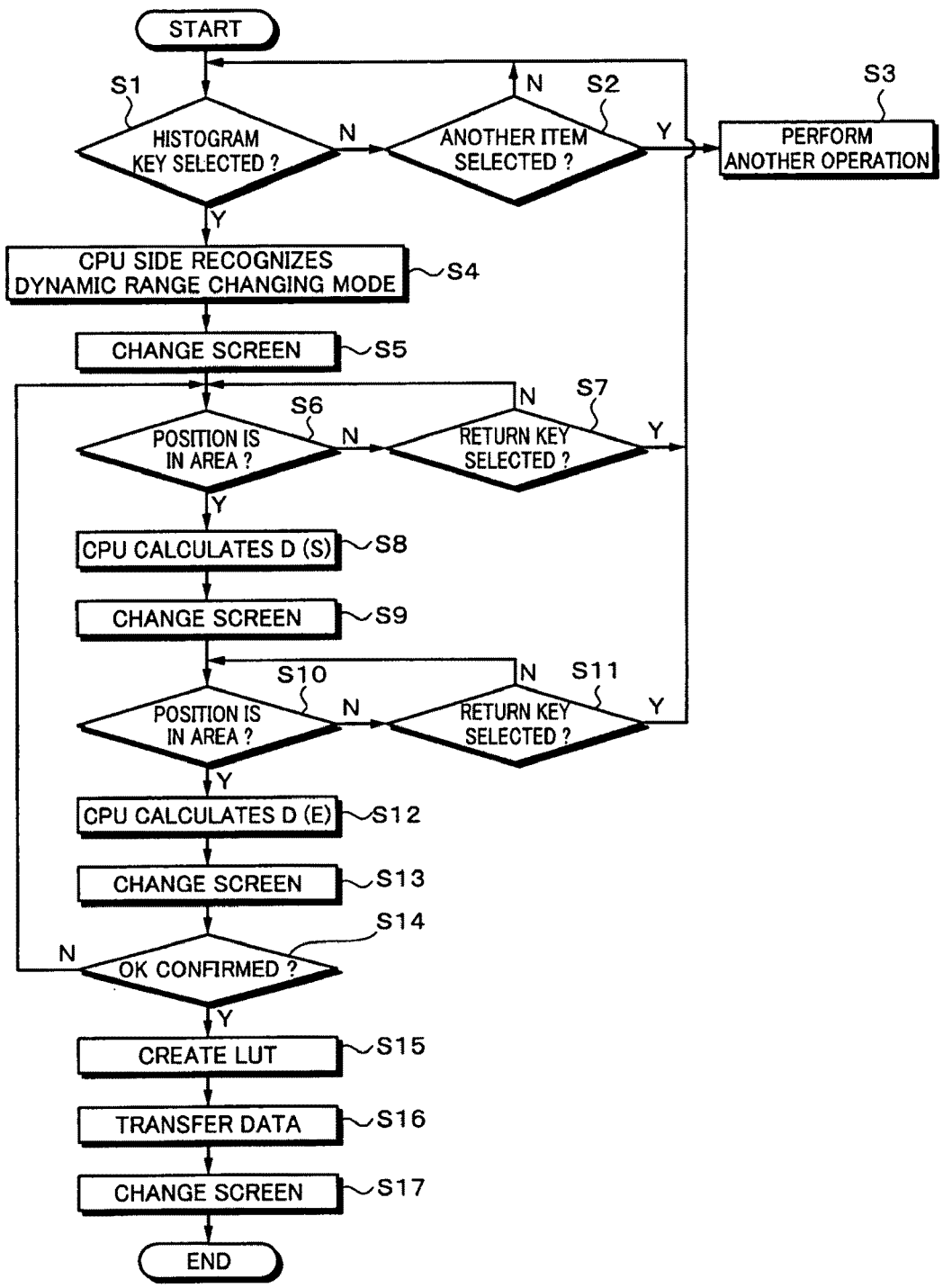
FIG. 19 is a flow chart showing a process of an imaging apparatus according to an embodiment of the present invention.

FIG. 19 is a flow chart showing a process of an imaging apparatus 1 according to an embodiment of the present invention. This process is controlled for example by the CPU 10 as follows.

At step S1, it is determined whether or not the histogram key 26 displayed on the LCD 6 has been selected and pressed. When the histogram key 26 has not been selected at step S1, the flow advances to step S2.

At step S2, it is determined whether or not another item key has been selected and pressed. When another item has not been selected and pressed at step S2, the flow returns to step S1. At step S1, it is determined whether or not the histogram key 26 has been pressed. When another item key has been selected and pressed at step S2, the flow advances to step S3. At step s3, a process corresponding to the key selected at step S2 is executed.

When the histogram key 26 has been selected and pressed at step S1, the flow advances to step S4. At step S4, the CPU 10 determines that the histogram key 26 have been pressed and recognizes that the dynamic range change mode has been selected. Thereafter, the flow advances to step S5.

At step S5, the screen displayed on the LCD 6 changes to a dynamic change mode screen. In other words, at step S5, a histogram representing a distribution of luminance of a picture displayed in the operation area 25 is displayed. The screen displayed on the LCD 6 changes to a start point setup mode screen. Thereafter, the flow advances to step S6.

At step S6, it is determined whether or not the position that the user has pressed is in the area of the histogram displayed on the LCD 6. When the position is not in the area, the flow advances to step S7.

At step S7, it is determined whether or not a return key to the initial screen has been pressed. When the return key has been pressed, the flow returns to step S1. At step S1, the screen displayed on the LCD 6 changes to the initial screen. When the return key has not been pressed, the flow returns to step S6. At step S6, it is determined whether or not the position that the user has pressed is in the area of the histogram.

When the position that the user has pressed is in the area of the histogram at step S6, the flow advances to step S8. At step S8, the luminance level D (S) corresponding to the start point is calculated on the basis of the position pressed at step S6. The CPU 10 calculates the luminance level D (S) on the basis of information supplied from for example the position detection section 21. Thereafter, the flow advances to step S9.

Since the start point has been set up, at step, the screen changes to an end point setup mode screen. Thereafter, the flow advances to step S10.

At step S10, it is determined whether or not the position pressed at step S10 is in the area of the histogram. When the position pressed at step S10 is outside the area of the histogram, the flow advances to step S11.

At step S11, it is determined whether or not the return key has been pressed. When the return key has been pressed, the flow returns to step S1 again. At step S1, the screen displayed on the LCD 6 changes to the initial screen. When the return key has not been pressed, the flow returns to step S10. At step S10, it is determined whether or not the position pressed at step S6 is in the area of the histogram.

When the position pressed at step S10 is in the area of the histogram, the flow advances to step S12. At step S12, the luminance level D (E) corresponding to the end point is calculated on the basis of the position pressed at step S10. For example, the CPU 10 calculates the luminance level D (E) on the basis of the information for example supplied from the position detection section 21. Thereafter, the flow advances to step S13.

At step S13, the screen displayed on the LCD 6 changes to a confirmation mode screen. On the confirmation mode screen, a YES key and a NO key with which the user confirms to change the dynamic range in the area that he or she has set up are displayed in the operation area 25 of the LCD 6. Thereafter, the flow advances to step S14.

At step S14, it is determined whether or not the YES key has been pressed to confirm the change of the dynamic range. When the NO key has been pressed, the flow returns to step S6. At step S6, the start point and the end point of the histogram are set up. In this case, the flow may return to step S1 instead of step S6. When the YES key has been pressed, the flow advances to step S15.

At step S15, the gamma table stored in the gamma correction section 16d is rewritten and a lookup table is created therewith. For example, the CPU 10 rewrites the gamma table so that the dynamic range displayed in the area from the luminance level D (S) to the luminance level D (E) corresponding to the start point and the end point that have been set up is increased. After the gamma table has been rewritten, the flow advances to step S16.

At step S16, with the gamma table newly set up, the gamma correction section 16d gamma-corrects a picture signal. The gamma-corrected picture signal is supplied from the gamma correction section 16d to the LCD drive circuit 5. Thereafter, the flow advances to step S17.

At step S17, the data line drive circuit and the gate line drive circuit that compose the LCD drive circuit 5 operate at predetermined timing. Thereafter, the screen displayed on the LCD 6 changes to another screen that displays a picture whose dynamic range has been increased.

In the foregoing embodiment, luminance levels corresponding to a start point and an end point on a histogram are selected. Instead, one of a start point and an end point on a histogram may be selected. For example, a luminance level corresponding to a start point may be fixed, whereas a luminance level corresponding to an end point may be selected.

In the foregoing embodiment, as an example of the imaging apparatus 1, a video recorder was used. However, an embodiment of the present invention can be applied to a digital still camera, a mobile phone having a camera function, and a personal digital assistant (PDA). In addition, an embodiment of the present invention can be applied to a picture displaying apparatus having a function of displaying pictures stored in (recorded on) a HDD, a semiconductor memory, or an optical disc and pictures obtained through a network on a display section.

The display section is not limited to an LCD. Instead, the display section may be composed of another type of a display device for example a cathode ray tube (CRT), a plasma display panel (PDP), or an organic electro luminescence panel. The positions and types of the operation keys on the LCD 6 and the position at which a picture is displayed are just examples. Thus, they are not limited to these examples.

According to the foregoing embodiment, as an example of a luminance distribution chart that represents a distribution of luminance levels, a histogram was exemplified. Instead, another type of a graph such as a rod graph may be used.

According to the foregoing embodiment, each process that composes the imaging apparatus can be structured with a dedicated hardware circuit. Instead, each process may be accomplished by a method or a programmed computer. A program in which the contents of the processes have been coded may be recorded to a computer readable record medium such as a magnetic recording apparatus, an optical disc, a magneto-optical disc, or a semiconductor memory.

It should be understood by those skilled in the art that various modifications, combinations, sub-combinations and alternations may occur depending on design requirements and other factors insofar as they are within the scope of the appended claims or the equivalents thereof.

What is claimed is:

1. A picture displaying method, comprising the steps of:
    capturing a first picture on an image capturing device, the image capturing device having a housing that includes an image sensor and a display section;
    displaying the first picture on the display section of the image capturing device;
    displaying on the display section, concurrently with the first picture, a luminance distribution chart which represents a distribution of luminance levels of the first picture;
    detecting a first position on the displayed luminance distribution chart selected by a user;
    detecting a second position on the displayed luminance distribution chart selected by the user;
    selecting a first luminance level and a second luminance level based on the detected first and second position, respectively, the second luminance level being higher than the first luminance level;
    correcting a gradation of the first picture in order to obtain a second picture by changing input and output characteristics defined by the first luminance level and the second luminance level; and
    switching from displaying the first picture on the display section to displaying the second picture on the display section
    displaying a third picture different from the first picture and the second picture;
    displaying another luminance distribution chart representing a distribution of luminance levels of the third picture; and
    setting up a third luminance level and a fourth luminance level on the other luminance distribution chart, the fourth luminance level being higher than the third luminance level,
    wherein at the setup step the number of pixels of the first picture whose luminance levels are equal to or lower than the first luminance level approaches the number of pixels of the third picture whose luminance levels are equal to or lower than the third luminance level,
    wherein the number of pixels of the first picture whose luminance levels are equal to or higher than the second luminance level approaches the number of pixels of the third picture whose luminance levels are equal to or higher than the fourth luminance level, and
    wherein when a new picture is displayed the number of pixels that become saturated black or saturated white remain unchanged and the third luminance level and the fourth luminance level are automatically setup, the third and fourth luminance levels representing a start point and an end point of the dynamic range.

2. The picture displaying method as set forth in claim 1, wherein, among luminance levels of the first picture, the first luminance level is a maximum value of luminance levels converted into a minimum value of a dynamic range for displaying, and wherein, among luminance levels of the first picture, the second luminance level is a minimum value of luminance levels converted into a maximum value of the dynamic range for displaying.

3. The picture displaying method as set forth in claim 1, further comprising the steps of:
    correcting a gradation of the third picture in order to obtain a fourth picture by changing input and output characteristics defined by the third luminance level and the fourth luminance level; and
    switching from displaying the third picture to displaying the fourth picture.

4. The picture displaying method as set forth in claim 1, wherein, among luminance levels of the third picture, the third luminance level is a maximum value of luminance levels converted into a minimum value of a dynamic range for displaying, wherein, among luminance levels of the third picture, the fourth luminance level is a minimum value of luminance levels converted into a maximum value of the dynamic range for displaying.

5. A picture displaying method, comprising the steps of:
    capturing a first picture on an image capturing device, the image capturing device having a housing that includes an image sensor and a display section;
    displaying the first picture on the display section of the image capturing device;
    setting up a desired area of the first picture;
    displaying on the display section a luminance distribution chart concurrently with the first picture that represents a distribution of luminance levels of the desired area;
    detecting a first position on the displayed luminance distribution chart selected by a user;
    detecting a second position on the displayed luminance distribution chart selected by the user;
    selecting a first luminance level and a second luminance level based on the detected first and second positions, respectively, the second luminance level being higher than the first luminance level;
    determining a minimum value and a maximum value of luminance levels of the desired area;

correcting a gradation of the first picture in order to obtain a second picture by changing input and output characteristics defined by the minimum value and the maximum value of the luminance levels;

switching from displaying the first picture on the display section to displaying the second picture on the display section displaying a third picture different from the first picture and the second picture;

displaying another luminance distribution chart representing a distribution of luminance levels of the third picture; and setting up a third luminance level and a fourth luminance level on the other luminance distribution chart, the fourth luminance level being higher than the third luminance level, wherein at the setup step the number of pixels of the first picture whose luminance levels are equal to or lower than the first luminance level approaches the number of pixels of the third picture whose luminance levels are equal to or lower than the third luminance level, wherein the number of pixels of the first picture whose luminance levels are equal to or higher than the second luminance level approaches the number of pixels of the third picture whose luminance levels are equal to or higher than the fourth luminance level, and wherein when a new picture is displayed the number of pixels that become saturated black or saturated white remain unchanged and the third luminance level and the fourth luminance level are automatically setup, the third and fourth luminance levels representing a start point and an end point of the dynamic range.

6. The picture displaying method as set forth in claim 5, wherein, among luminance levels of the first picture, the minimum value of the luminance levels is a maximum value of luminance levels converted into a minimum value of a dynamic range for displaying, and wherein, among luminance levels of the first picture, the maximum value of the luminance levels is a minimum value of luminance levels converted into a maximum value of the dynamic range for displaying.

7. A picture displaying apparatus, comprising:

an image capturing device having a housing that includes an image sensor and a display section configured to display a first picture and concurrently display a luminance distribution chart representing a distribution of luminance levels of the first picture;

a position detection section that detects a first user selected position and a second user selected position on the luminance distribution chart;

a luminance level determination section which determines a first luminance level and a second luminance level selected based on the detected first and second user selected positions, respectively, the second luminance level being higher than the first luminance level;

a gradation correction section which changes input and output characteristics defined by the first luminance level and the second luminance level to correct a gradation of the first picture and obtain a second picture;

a display control section which switches from displaying the first picture to displaying the second picture wherein the display control section subsequently switches from displaying the second picture to displaying a third picture different from the first picture and the second picture with another luminance distribution chart representing a distribution of luminance levels of the third picture and the luminance level determination section sets up a third luminance level and a fourth luminance level on the other luminance distribution chart, the fourth luminance level being higher than the third luminance level, wherein the number of pixels of the first picture whose luminance levels are equal to or lower than the first luminance level approaches the number of pixels of the third picture whose luminance levels are equal to or lower than the third luminance level, and wherein the number of pixels of the first picture whose luminance levels are equal to or higher than the second luminance level approaches the number of pixels of the third picture whose luminance levels are equal to or higher than the fourth luminance level, wherein when a new picture is displayed the number of pixels that become saturated black or saturated white remain unchanged and the third luminance level and the fourth luminance level are automatically setup, the third and fourth luminance levels representing a start point and an end point of the dynamic range.

8. A picture displaying apparatus, comprising:

an image capturing section disposed in a housing;

a display section disposed in the housing, which displays a first picture and concurrently displays a luminance distribution chart;

a luminance level determination section which determines a minimum value and a maximum value of luminance levels of an area set up for the first picture, wherein the minimum value and the maximum value are based on a first position on the displayed luminance distribution chart selected by a user and a second position on the displayed luminance distribution chart selected by the user, respectively;

a gradation correction section which changes input and output characteristics defined by the minimum value and the maximum value of the luminance levels to correct a gradation of the first picture and obtain a second picture;

a display control section which switches from displaying the first picture to displaying the second picture on the display section;

wherein the display control section subsequently switches from displaying the second picture to displaying a third picture different from the first picture and the second picture with another luminance distribution chart representing a distribution of luminance level the third picture and the luminance level determination section sets up a third luminance level and a fourth luminance level on the other luminance distribution chart, the fourth luminance level being higher than the third luminance level, wherein the number of pixels of the first picture whose luminance levels are equal to or lower than the first luminance level approaches the number of pixels of the third picture whose luminance levels are equal to or lower than the third luminance level, wherein the number of pixels of the first picture whose luminance levels are equal to or higher than the second luminance level approaches the number of pixels of the third picture whose luminance levels are equal to or higher than the fourth luminance level, and wherein when a new picture is displayed the number of pixels that become saturated black or saturated white remain unchanged and the third luminance level and fourth luminance level are automatically setup, the third and fourth luminance levels representing a start point and an end point of the dynamic range.

9. An imaging apparatus, comprising:
an imaging section disposed in a housing of an image capturing device;
a display section disposed in the housing and configured to display a first picture captured by the imaging section and concurrently display a luminance distribution chart representing a distribution of luminance levels of the first picture;
a position detection section that detects a first user selected position and a second user selected position on the luminance distribution chart;
a luminance level determination section which determines a first luminance level and a second luminance level selected based on the detected first and second user selected positions, respectively, the second luminance level being higher than the first luminance level;
a gradation correction section which changes input and output characteristics defined by the first luminance level and the second luminance level to correct a gradation of the first picture and obtain a second picture;
a display control section which switches from displaying the first picture to displaying the second picture on the display section,
wherein the display control section subsequently switches from displaying second picture to displaying a third picture different from the first picture and the second picture with another luminance distribution chart representing a distribution of luminance levels of the third picture and the luminance level determination section sets up a third luminance level and a fourth luminance level on the other luminance distribution chart, the fourth luminance level being higher than the third luminance level,
wherein the number of pixels of the first picture whose luminance levels are equal to or lower than the first luminance level approaches the number of pixels of the third picture whose luminance levels are equal to or lower than the third luminance level,
wherein the number of pixels of the first picture whose luminance levels are equal to or higher than the second luminance level approaches the number of the third picture whose luminance levels are equal to or higher than the fourth luminance level, and
wherein when a new picture displayed the number of pixels that become saturated black or saturated white remain unchanged and the third level and the fourth luminance level are automatically setup, the third and fourth luminance levels representing a start point and an end point of the dynamic range.

10. The picture displaying method of claim 1, wherein the display device is a touch panel.

11. The picture displaying method of claim 10, wherein the first luminance level is detected by the touch panel and the second luminance level is detected by the touch panel.

12. The picture displaying method of claim 5, wherein the display device is a touch panel.

13. The picture displaying method of claim 12, wherein the first luminance level is detected by the touch panel and the second luminance level is detected by the touch panel.

14. The picture displaying apparatus of claim 7, wherein the display section is a touch panel.

15. The picture displaying apparatus of claim 14, wherein the first luminance level is detected by the touch panel and the second luminance level is detected by the touch panel.

16. The picture displaying apparatus of claim 8, wherein the display section is a touch panel.

17. The picture displaying apparatus of claim 16, wherein the minimum luminance level is detected by the touch panel and the maximum luminance level is detected by the touch panel.

18. The imaging apparatus of claim 9, wherein the display section is a touch panel.

19. The imaging apparatus of claim 18, wherein the first luminance level is detected by the touch panel and the second luminance level is detected by the touch panel.

* * * * *